United States Patent [19]

Fujino et al.

[11] Patent Number: 5,117,250
[45] Date of Patent: May 26, 1992

[54] FLASHLIGHT PHOTOGRAPHING DEVICE

[75] Inventors: Akihiko Fujino; Tsutomu Ichikawa; Katsuyuki Nanba; Nobuyuki Taniguchi, all of Osaka, Japan

[73] Assignee: Minolta Camera Kabushiki Kaisha, Osaka, Japan

[21] Appl. No.: 741,031

[22] Filed: Aug. 6, 1991

Related U.S. Application Data

[62] Division of Ser. No. 515,726, Apr. 27, 1990, Pat. No. 5,055,865.

[30] Foreign Application Priority Data

| Apr. 27, 1989 | [JP] | Japan | 1-108920 |
| Apr. 27, 1989 | [JP] | Japan | 1-108921 |
| Apr. 27, 1989 | [JP] | Japan | 1-108922 |

[51] Int. Cl.$^5$ .................. G03B 1/00; G03B 13/36; G03B 15/05
[52] U.S. Cl. .................. 354/400; 354/484; 354/127.11; 354/173.1
[58] Field of Search ............ 354/400, 418, 484, 127.1, 354/127.11, 127.12, 145.1, 173.1, 173.11

[56] References Cited

U.S. PATENT DOCUMENTS

| 4,333,719 | 6/1982 | Takami et al. | 354/132 |
| 4,426,144 | 1/1984 | Kawazoe | 354/145.1 |
| 4,470,684 | 9/1984 | Harvey | 354/145.1 X |
| 4,522,480 | 6/1985 | Kawabata et al. | 354/484 X |
| 4,573,786 | 3/1986 | Taniguchi et al. | 354/416 |
| 4,607,931 | 8/1986 | Aihara | 354/400 |
| 4,692,013 | 9/1987 | Okino | 354/413 |
| 4,705,373 | 11/1987 | Ohmori | 354/127.11 |
| 4,717,934 | 1/1988 | Kobayashi et al. | 354/415 |
| 4,761,666 | 8/1988 | Goto | 354/133 |
| 4,799,078 | 1/1989 | Hayama | 354/418 X |
| 4,963,916 | 10/1990 | Tanaka et al. | 354/418 X |
| 4,992,821 | 2/1991 | Kiuchi et al. | 354/484 X |
| 5,016,038 | 5/1991 | Kobayashi et al. | 354/418 X |
| 5,023,470 | 6/1991 | Onozuka et al. | 354/127.1 |
| 5,034,662 | 7/1991 | Nishida et al. | 354/127.11 X |

FOREIGN PATENT DOCUMENTS

63-128530 8/1988 Japan.

*Primary Examiner*—W. B. Perkey
*Attorney, Agent, or Firm*—Willian Brinks Olds Hofer Gilson & Lione

[57] ABSTRACT

A flashlight photographing device wherein the possibility of missing a shutter chance is minimized, a shutter speed can be set appropriately upon trailing shutter blind synchronized photographing, and an interval of time is minimized until a subsequent photographing operation is permitted. The flashlight includes a plurality of flash devices which are controlled such that one of them which has been charged up at the earliest is caused to emit flashlight. After the charged voltage of a main capacitor of one of the flash devices becomes higher than a second predetermined value but lower than a first predetermined value at which the flash device can operate to emit light, operation of an automatic focusing motor or a film winding motor of a camera is started. When trailing shutter blind synchronized photographing is to be performed in an exposure mode wherein a shutter speed is to be automatically set, exposure of the camera is controlled in accordance with a predetermined exposure time as in bulb exposure.

7 Claims, 26 Drawing Sheets

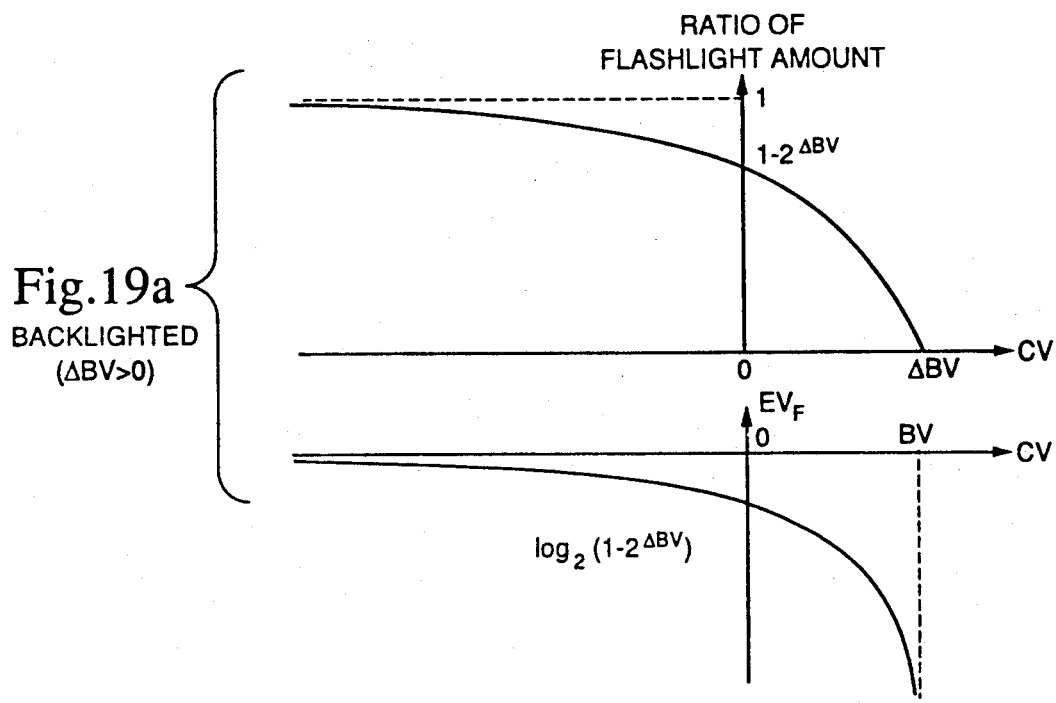
Fig.19a BACKLIGHTED ($\Delta BV > 0$)
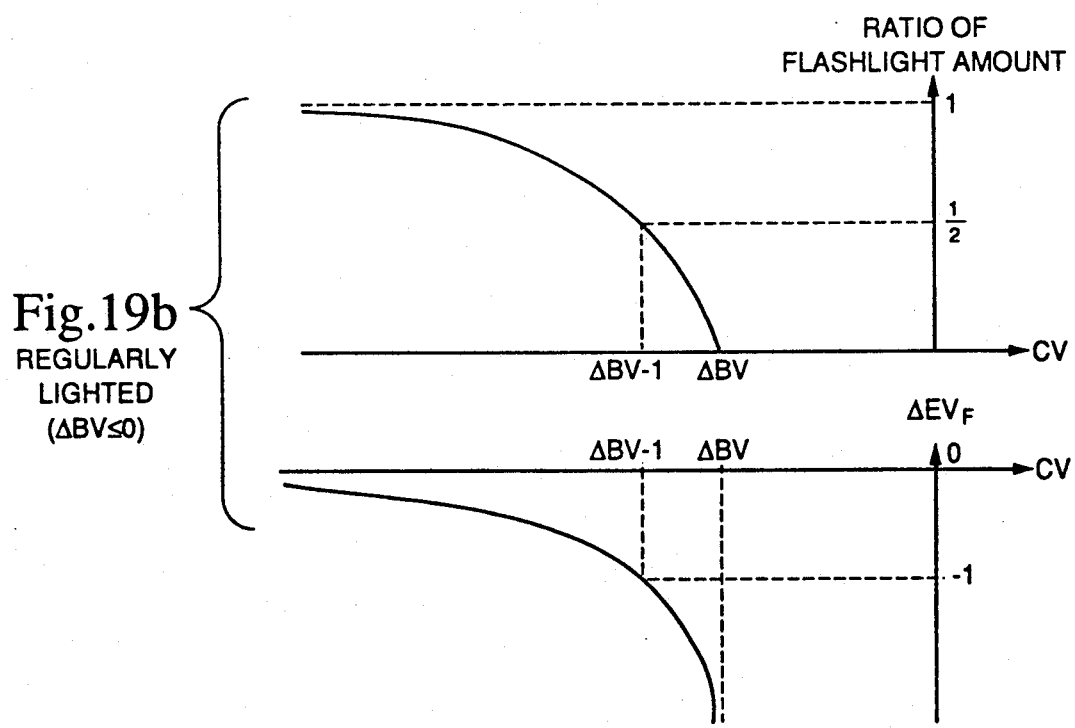
Fig.19b REGULARLY LIGHTED ($\Delta BV \leq 0$)

FLASHLIGHT PHOTOGRAPHING DEVICE

This application is a division of application Ser. No. 07/515,726, filed Apr. 27, 1990, now U.S. Pat. No. 5,055,865.

BACKGROUND OF THE INVENTION

1. Field of the Invention

This invention relates to a flashlight photographing device having an internal flash device.

2. Description of the Prior Art

A camera having an internal or built-in flash device is already known wherein, when an external flash device is mounted on the camera, emission of flashlight from the internal flash device is inhibited to allow only the external flash device to emit flashlight.

In a conventional camera of the type just mentioned, since emission of flashlight from the internal flash device is inhibited when an external flash device is mounted on the camera, even if the internal flash device has been charged up already, it must be waited that the external flash is charged up. Accordingly, charging of the internal flash device comes to nothing. Besides, a shutter chance may possibly be missed because flashlight cannot be emitted although the internal flash device is already in a charged up condition.

Also a flashlight photographing device is conventionally known which includes a focal plane shutter and can be selectively set to a leading shutter blind synchronization mode or a trailing shutter blind synchronization mode. In particular, trailing shutter blind synchronized photographing is conventionally disclosed, for example, in Japanese Patent Laid-Open No. 56-168480 or Japanese Utility Model Laid-Open No. 63-19832 wherein flashlight is emitted in a synchronized relationship with movement of a trailing shutter blind of a focal plane shutter. Meanwhile, another flashlight photographing device is disclosed, for example, in U.S. Pat. No. 4,717,934 (corresponding to Japanese Patent Laid-Open No. 61-156236) which can be selectively set to a leading shutter blind synchronization mode wherein flashlight is emitted in a synchronized relationship with movement of a leading shutter blind or such a trailing shutter blind synchronization mode as described above. If trailing shutter blind synchronized photographing is performed, then a photograph can be obtained with which it is felt that an object photographed is moving in an appropriate direction. The shutter speed then is determined such that, if a preset shutter speed is higher than a synchronizable speed, then it is set equal to the synchronizable speed, but if the preset shutter speed is slower than the synchronizable speed, then it is set equal to the preset shutter speed.

However, if the trailing shutter blind synchronization mode is selected when an exposure control mode such as a programmed automatic exposure mode or an aperture priority automatic exposure mode is selected wherein a shutter speed is automatically set on the camera side, it is impossible to manually set a shutter speed. Accordingly, a photographing effect by trailing shutter blind synchronized photographing cannot be attained sufficiently.

On the other hand, in a flashlight photographing device of the type including an internal or built-in flash device, charging of the internal flash device is normally performed simultaneously with energization of an automatic focusing motor for driving a focusing lens and/or a film feeding motor for driving a film feeding device by means of a single battery power source.

An exemplary one of flashlight photographing devices of the type mentioned just above is disclosed, for example, in Japanese Utility Model Laid-Open No. 63-128530 wherein, when a flash charging operation of a flash charging circuit is to be performed during operation of a driving circuit such as an automatic focusing motor driving circuit or a film winding motor driving circuit, such flash charging operation is permitted only when the power source voltage is higher than a reference voltage which is set higher than a lowest operable voltage with which the driving circuit can operate. In the flashlight photographing device, when the power source voltage is equal to or higher than the lowest operable voltage of the driving circuit but lower than the reference voltage, no charging operation of the flash charging circuit is performed during operation of the driving circuit.

SUMMARY OF THE INVENTION

It is an object of the present invention to provide a flashlight photographing device wherein the possibility of missing a shutter chance is minimized.

It is another object of the present invention to provide a flashlight photographing device wherein a shutter speed can be set appropriately upon trailing shutter blind synchronized photographing.

It is a further object of the present invention to provide a flashlight photographing device which minimizes an interval of the time until a subsequent photographing operation is permitted.

In order to attain the objects, according to one aspect of the present invention, there is provided a flashlight photographing device including first and second flash devices which are selectively rendered operative to emit flashlight, which comprises first judging means for judging whether or not the first flash device is in an operable condition in which the first flash device is capable of emitting flashlight and for outputting a first light emission enabled signal when the first flash device enters the operable condition, second judging means for judging whether or not the second flash device is in an operable condition in which the second flash device is capable of emitting flashlight and for outputting a second light emission enabled signal when the second flash device enters the operable condition, third judging means for judging from which one of the first and second judging means a light emission enabled signal is outputted precedently to the other, and selecting means for selectively enabling, in accordance with a result of judgment of the third judging means, a corresponding one of the first and second flash devices to that one of the first and second judging means which outputs a light emission enabled signal precedently to other.

With the flashlight photographing device, one of the first and second flash devices which has been charged up precedently to the other flash device is caused to emit flashlight. Consequently, charging of the other flash device does not come to nothing, and only if either one of the first and second flash devices is put into a charged up condition, the flashlight photographing can be performed. Accordingly, the possibility that a shutter chance may be missed is reduced particularly upon successive photographing.

According to another aspect of the present invention, there is provided a flashlight photographing device which comprises a focal plane shutter including a leading shutter blind and a trailing shutter blind, flashlight emitting means, first selecting means for selecting one of a leading shutter blind synchronization mode in which flashlight is emitted in a synchronized relationship with completion of movement of the leading shutter blind and a trailing shutter blind synchronization mode in which flashlight is emitted in a synchronized relationship with completion of movement of the trailing shutter blind, a light measuring circuit for measuring a brightness of an object to be photographed, first exposure time outputting means for outputting an exposure time which is automatically determined in accordance with a measured light value obtained from the light measuring circuit, second exposure time outputting means for outputting a predetermined exposure time, second selecting means for selecting an output of the first exposure time outputting means when the leading shutter blind synchronization mode is selected by the first selecting means but selecting an output of the second exposure time outputting means when the trailing shutter blind synchronization mode is selected by the first selecting means, and exposure controlling means for controlling exposure of a camera in accordance with an exposure time selected by the second selecting means.

With the flashlight photographing device, when trailing shutter blind synchronized photographing is to be performed in an exposure mode wherein the exposure value is to be automatically set, exposure of the camera is controlled in accordance with the predetermined exposure time which may be, for example, bulb exposure. Accordingly, even in an exposure control mode wherein a photographer cannot manually set an exposure value, a photograph can be taken which exhibits an effect of trailing shutter blind synchronized photographing which is intended by the photographer.

According to a further aspect of the present invention, there is provided a flashlight photographing device which comprises a battery power source, a first high power consuming circuit for receiving power from the battery power source, the first high power consuming circuit requiring large current at energization thereof, a second high power consuming circuit for receiving power from the battery power source, the second high power consuming circuit requiring large current at energization thereof, detecting means for detecting whether or not the power supply of the battery power source recovers to a first predetermined value with which the high power consuming circuit is capable of operating or reaches a second predetermined value with which the second high power consuming circuit is capable of operating, the second predetermined value being lower than the first predetermined value, and power supply controlling means for initially permitting supply of power from the battery power source to the first high power consuming circuit while inhibiting supply of power from the battery power source to the second high power consuming circuit and then permitting, after the power supply from the battery power source exceeds the second predetermined value, supply of power from the battery power source to the second high power consuming circuit, whereby supply of power from the battery power source to both of the boosting circuit and the second high power consuming circuit is permitted while the power supply of the battery power source rises from the second predetermined value to the first predetermined value.

With the flashlight photographing device, when it is detected that the power supply of the battery power source is higher than the second predetermined value but lower than the first predetermined value, operation of the second high power consuming circuit such as an automatic focusing motor or a film winding motor of a camera is started. Accordingly, an automatic focusing operation and/or a film winding operation can be started before the power supply of the battery power source reaches the second predetermined value after it has recovered to the first predetermined value, and therefore, an interval of time until next photographing is permitted can be reduced.

According to a still further aspect of the present invention, there is provided a flashlight photographing device, which comprises a battery power source, a first high power consuming circuit for receiving power from the battery power source, the first high power consuming circuit including a xenon tube for emitting flashlight, a boosting circuit for boosting a low voltage of the battery power source to a sufficiently high voltage to permit the xenon tube to emit flashlight, and a main capacitor adapted to be charged with energy of a high voltage boosted by the boosting circuit, a second high power consuming circuit for receiving power from the battery power source, detecting means for detecting whether or not the charged voltage of the main capacitor reaches a first predetermined value with which the xenon tube is capable of emitting flashlight or reaches a second predetermined value which is lower than the first predetermined value but with which the second high power consuming circuit is capable of operating, and power supply controlling means for first permitting supply of power from the battery power source to the first high power consuming circuit while inhibiting supply of power from the battery power source to the second high power consuming circuit and then permitting, after the charged voltage of the main capacitor exceeds the second predetermined value, supply of power from the battery power source to the second high power consuming circuit, whereby supply of power from the battery power source to both of the boosting circuit and the second high power consuming circuit is permitted while the charged voltage of the main capacitor rises from the second predetermined value to the first predetermined value.

With the flashlight photographing device, when it is detected that the charged voltage of the main capacitor for the accumulation of light emission energy for a flash device is higher than the second predetermined value but lower than the first predetermined value, operation of the second high power consuming circuit such as an automatic focusing motor or a film winding motor of a camera is started. Accordingly, an automatic focusing operation and/or a film winding operation can be started midway during charging of the main capacitor, and therefore, an interval of time until next photographing is permitted can be reduced.

The above and other objects, features and advantages of the present invention will become apparent from the following description and the appended claims, taken in conjunction with the accompanying drawings.

BRIEF DESCRIPTION OF THE DRAWINGS

FIGS. 19a and 19b are diagrams illustrating relationships between a difference in exposure value between a peripheral portion and a central portion of a screen to be photographed and a ratio of a flashlight amount in a backlighted condition and a regularly lighted condition of an object to be photographed, respectively, in the internal flash device;

DESCRIPTION OF THE PREFERRED EMBODIMENT

Figure 1:
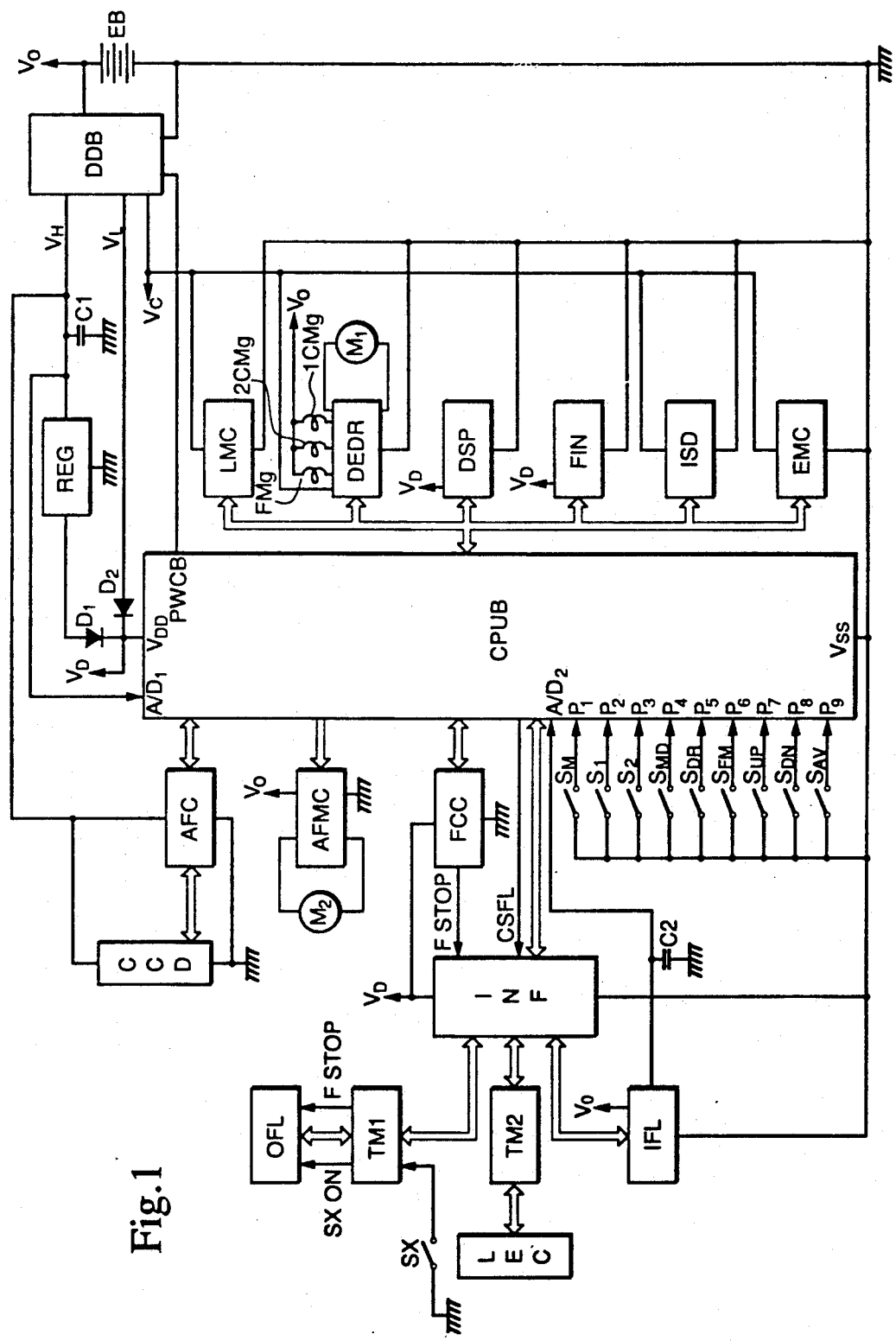
FIG. 1 is a circuit diagram of a camera system to which the present invention is applied.

Referring first to FIG. 1, there is shown construction of an electric circuit of a camera system to which the present invention is applied. The electric circuit shown includes a microcomputer CPUB disposed in a body (not shown) of the camera for executing calculations for the automatic exposure and automatic focusing and sequence control of the entire camera. The microcomputer CPUB is connected to various peripheral circuits so that information may be exchanged between them.

One of the peripheral circuits is a light measuring circuit LMC having a spot ligth measuring function of measuring a brightness $BV_S$ at a central portion of a screen to be photographed and a peripheral light measuring function of measuring a brightness $BV_{AM}$ of the entire screen to be photographed except such central portion. Information of the central brightness $BV_S$ and the peripheral brightness $BV_{AM}$ is converted into digital amounts and then transmitted to the microcomputer CPUB.

A decoder driver DEDR is provided to drive a leading shutter blind movement starting magnet 1CMg, a trailing shutter blind movement starting magnet 2CMg and an aperture controlling magnet FMg in response to an aperture value and a shutter speed calculated by the microcomputer CPUB and also to drive a film winding and charging motor $M_1$.

A display circuit DSP for providing an external indication receives display data from the microcomputer CPUB and makes a necessary indication on a liquid crystal display panel on the camera body. Such indication may include, for example, a shutter speed, an aperture value, an exposure control mode, a drive mode, a flash mode and a count value of frames of a film.

Another display circuit FIN for providing an internal indication receives display data from the microcomputer CPUB and makes a necessary indication in a viewfinder of the camera. Such indication may include, for example, an indication of completion of charging of a flash device, an indication of a focused condition, an indication that detection of a focus condition is impossible, a contrast (difference in exposure value) between a central portion and a peripheral portion of a screen to be photographed upon flashlight photographing, and a flash coverage to be irradiated with flashlight in a screen to be photographed.

A film sensitivity reading circuit ISD reads information of a film sensitivity recorded on a film magazine or in a semiconductor memory or the like mounted in a film magazine and transmits the thus read information to the microcomputer CPUB. The information is used for the exposure calculation by the microcomputer CPUB. It is to be noted that a manually operable member such as a push-button or a dial may otherwise be provided for the film sensitivity reading circuit ISD so that a film sensitivity may be set or changed manually.

An exposure compensation amount setting circuit EMC outputs an exposure compensation amount set in accordance with a known method to the microcomputer CPUB.

A focus detecting circuit AFC includes a circuit for driving a charge coupled device CCD for the detection of a focus which converts light of an object passing through a photographing lens of the camera into an electrical signal, and another circuit for processing an analog output signal of the charge coupled device CCD, converting the analog signal into a digital signal and supplying the digital signal to the microcomputer CPUB.

An automatic focusing motor controlling circuit AFMC controls forward rotation, reverse rotation and stopping of an automatic focusing motor $M_2$ for driving a focusing lens of the photographing lens. An amount N of rotation of the automatic focusing motor $M_2$ is normally monitored by the microcomputer CPUB in order to enable the judgment whether or not the automatic focusing motor $M_2$ has been driven by a predetermined amount upon automatic focusing and also to enable a calculation of a photographing distance to or a photographing magnification of a main object by discrimination of a driving amount of the focusing lens from an infinite photographing position.

An external flash device OFL is removably mounted on a hot shoe (not shown) at the top of the camera body. Circuit construction of the external flash device OFL will be hereinafter described with reference to FIG. 2. A connecting terminal TM1 for the connection between the external flash device OFL and the camera body is disposed on the hot shoe.

An internal flash device IFL is built in the camera body and emits flashlight under the control of the microcomputer CPUB. A capacitor C2 accumulates therein energy for the emission of flashlight from the internal flash device IFL.

A lens circuit LEC is built in the photographing lens and transmits lens data peculiar to the photographing lens to the camera body. Such lens data may include, for example, a minimum aperture value (open aperture value) $AV_O$, a maximum aperture value (aperture value corresponding to a minimum opening aperture) AVmax, a focal length f and a conversion coefficient K. Here, the conversion coefficient K is a coefficient with which a defocusing amount DF obtained by the focus detecting circuit AFC is to be converted into a driving amount ΔN of the focusing lens. A connecting terminal TM2 for the connection between the lens circuit LEC and the camera body is disposed on or in the neighborhood of a lens mount.

A synchronization switch SX is turned on upon completion of movement of the leading shutter blind of the focal plane shutter. When the switch SX is turned on upon photographing synchronized with the leading shutter blind, a light emission starting signal SXON is delivered from the switch SX to the external flash device OFL by way of the connecting terminal TM1.

A flashlight adjusting circuit FCC for controlling the amount of flashlight to be emitted from a flash device measures an amount of light reflected from an object to be photographed upon flashlight photographing and admitted into the camera body by way of the photographing lens and produces a light emission stopping signal FSTOP when the amount of light reflected from the object reaches a predetermined level. Such signal FSTOP is delivered by way of an interface circuit INF and the connecting terminal TM1 to the external flash device OFL to stop emission of flashlight from the external flash device OFL. The signal FSTOP is delivered also to the microcomputer CPUB, and when the signal FSTOP is received, the microcomputer CPUB causes the built-in flash device IFL to stop emission of light therefrom.

The interface circuit INF is interposed between the microcomputer CPUB and the lens circuit LEC, internal flash device IFL and external flash device OFL.

The microcomputer CPUB has input ports $P_1$ to $P_9$ which are normally pulled up to a "High" level by means of respective resistors not shown and individually connected to the ground by way of different switches. If either one of the switches is turned on, a corresponding one of the input ports P1 to P9 is pulled down to a "Low" level, which is discriminated by the microcomputer CPUB. Such switches will be individually described below.

One of the switches is a main switch $S_M$ which has an on-state in which operation of the camera is enabled and an off-state in which operation of the camera is disabled.

A photographing preparation switch $S_1$ is turned on upon depression of a release button (not shown) to a first depth. In response to turning on of the switch $S_1$, a light measuring operation, an exposure calculating operation and an automatic focusing operation are started.

A release switch $S_2$ is turned on upon depression of the release button to a second depth greater than the first depth, and in response to turning on of the switch $S_2$, an exposure controlling operation is started.

A switch $S_{MD}$ is provided for changing over an exposure control mode. Each time the switch $S_{MD}$ is turned on, the current exposure control mode is successively changed over to a P mode, to an A mode, to an S mode, to an M mode and then to the P mode. Here, the P mode is a programmed automatic exposure (AE) mode in which both of a shutter speed and a aperture value are automatically set on the camera side. The A mode is an aperture priority automatic exposure mode in which only an aperture value is set manually while a shutter speed is automatically set on the camera side. The S mode is a shutter speed priority automatic exposure mode in which only a shutter speed is set manually while an aperture value is automatically set on the camera side. The M mode is a manual mode in which both of a shutter speed and an aperture value are set manually.

A drive mode changing over switch $S_{DR}$ is provided to change over, each time it is turned on, the current drive mode alternately between a single photographing mode and a successive photographing mode.

A flash mode changing over switch $S_{FM}$ is provided to change over, each time it is turned on, the current flash mode sucessively to a compulsory flashlight emission mode, to an automatic flashlight emission mode, to a trailing shutter blind synchronization mode, to a no flashlight emission mode and then to the compulsory flashlight emission mode. Here, the compulsory flashlight emission mode is a mode in which flashlight is always emitted upon photographing, and the automatic flashlight emission mode is a mode wherein emission of flashlight is automatically performed in accordance with a brightness distribution of a field to be photographed. In either of the two modes, flashlight is emitted in a synchronized relationship to closing of the synchronization switch SX (that is, to completion of movement of the leading shutter blind), that is, leading shutter blind synchronization flashlight emission is performed. Meanwhile, the trailing shutter blind synchronization mode is a mode in which flashlight is emitted in a synchronized relationship to starting of movement of the trailing shutter blind. Finally, the no light emission mode is a mode in which no flashlight is emitted in any case.

An up switch $S_{UP}$ and a down switch $S_{DN}$ serve, when the photographing preparation switch $S_1$ is in an off-state, up and down switches, respectively, for setting an aperture value or a shutter speed, but serve, when the photographing preparation switch $S_1$ is in an on-state, up and down switches, respectively, for setting a contrast in brightness (CV value) between a peripheral portion and a central portion of a field to be photographed upon flashlight photographing. Such contrast or CV value will be hereinafter described in detail.

An aperture value setting switch $S_{AV}$ is provided to increase or decrease an aperture value when the up or down switch $S_{UP}$ or $S_{DN}$ is operated with the switch $S_{AV}$ held in an on-state while the photographing preparation switch S1 is in an off-state in the M mode but to increase or decrease a shutter speed when the up or down switch $S_{UP}$ or $S_{DN}$ is operated with the switch $S_{AV}$ held in an off-state.

Subsequently, power supply will be described.

The power supply includes a power source battery EB in the camera body. An output voltage $V_O$ of the power source battery EB is directly supplied to several circuits and elements which are high in load including the motors M1 and M2, magnets FMg, 1CMg and 2CMg and internal flash device IFL.

An in-body boosting circuit DDB performs a boosting operation when an in-body power source controlling signal PWCB has a "Low" level. The in-body boosting circuit DDB is adapted to provide a high voltage $V_H$ (for example, 13 volts) which is used for the power source of the charge coupled device CCD of the focus detecting circuit AFC, a low voltage $V_L$ (for example, 5 volts) which is supplied over a power source line $V_D$ by way of a diode $D_2$ and used for the power source of the microcomputer CPUB, interface circuit INF, and display circuits DSP and FIN, and another low voltage $V_C$ (for example, 5 volts) which is used for the power source for any other circuit.

A backup capacitor C1 is charge up with the high voltage $V_H$. In the camera system of the present embodiment, while the internal flash device IFL is being charged, the in-body power source controllin signal PWCB is held at a "High" level to keep the in-body boosting circuit DDB inoperative as hereinafter described. Consequently, the voltages $V_H$, $V_L$ and $V_C$ are not provided from the in-body boosting circuit DDB. However, thanks to the charged up voltage of the capacitor C1, a regulator REG is operated so that power may be continuously supplied from the capacitor C1 to the power source line $V_D$ by way of a diode $D_1$. Accordingly, even during charging of the internal flash device IFL, the microcomputer CPUB and display circuits DSP and FIN continues their operations. Further, in the camera of the present embodiment, in order to prevent the voltage of the backup capacitor C1 from dropping to a level lower than a lowest operation voltage $V_1$ (for example, 3 volts) at which the regulator REG can operate to disable the microcomputer CPUB and so forth, the voltage of the capacitor C1 is normally monitored at a voltage monitoring terminal $A/D_1$ of the microcomputer CPUB so that, when it drops to the lowest operation voltage $V_1$ of the regulator REG, the in-body power source controlling signal PWCB is changed to a "Low" level to render the boosting circuit DDB operative and once stops the charging operation of the internal flash device IFL to cause the capacitor C1 to be charged again.

The microcomputer CPUB has another terminal $A/D_2$ for monitoring a charged voltage of the capacitor C2 which is provided to accumulate therein energy for the emission of flashlight. The microcomputer CPUB thus judges in accordance with a signal at the terminal $A/D_2$ thereof whether or not the charged voltage of the capacitor C2 is higher than a predetermined voltage $V_2$. This will be hereinafter described in detail.

Figure 2:
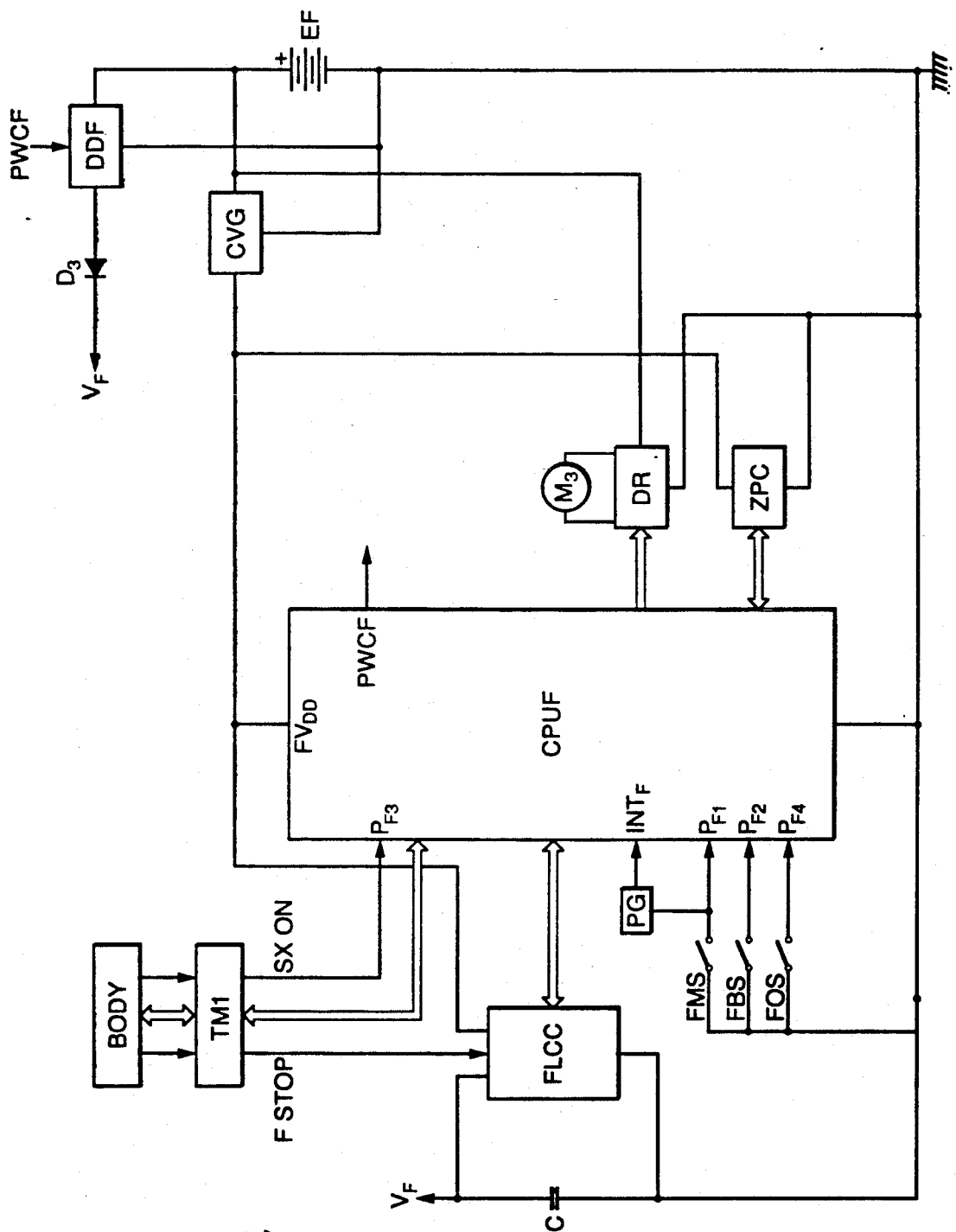
FIG. 2 is a circuit diagram of an external flash device for use with the camera system of FIG. 1.

Referring now to FIG. 2, there is shown, in block circuit diagram, internal construction of the external flash device OFL. The external flash device OFL includes an in-flash microcomputer CPUF for executing sequence control of various elements of the external flash device. Only when emission of flashlight is permitted, the microcomputer CPUF transmits, upon reception of a light emission starting signal SXON at a terminal $P_{F3}$ thereof, a signal to a flashlight emission controlling circuit FLCC to start emission of flashlight.

The external flash device OFL further includes a power source battery EF, and a main capacitor MC for accumulating therein energy for the emission of flashlight. An in-flash boosting circuit DDF boosts an input voltage from the power source battery EF to charge the capacitor MC. The in-flash boosting circuit DDF performs its boosting operation when an in-flash power source signal PWCF presents a "Low" level. An in-flash constant voltage source CVG supplies a constant voltage $FV_{DD}$ to low power consuming elements of the external flash device OFL including the microcomputer CPUF.

The external flash device OFL further includes a motor $M_3$ for changing over an irradiation angle of flashlight, and a driver DR for driving the motor $M_3$.

The external flash device OFL further includes a circuit ZPC which produces position data of a flashlight irradiation angle changing member which is driven by the motor $M_3$. The circuit ZPC may be constituted particularly from a code plate on which a conductor pattern is formed, and a brush for reading a code from the code plate.

The flashlight emission controlling circuit FLCC includes a known flashlight emitting element therein. The circuit FLCC normally monitors a charged voltage of the capacitor MC and outputs, when the charged voltage of the capacitor MC is higher than a predetermined level (for example, 300 volts) at which the external flash device OFL can operate to emit flashlight, a charged up or charging completion signal to the in-flash microcomputer CPUF. Then, when a light emission starting signal is received from the microcomputer CPUF, the flashlight emission controlling circuit FLCC starts emission of flashlight, but stops its emission of flashlight when it receives a flashlight emission stopping signal FSTOP from the flashlight adjusting circuit FCC in the camera body.

Figure 15:
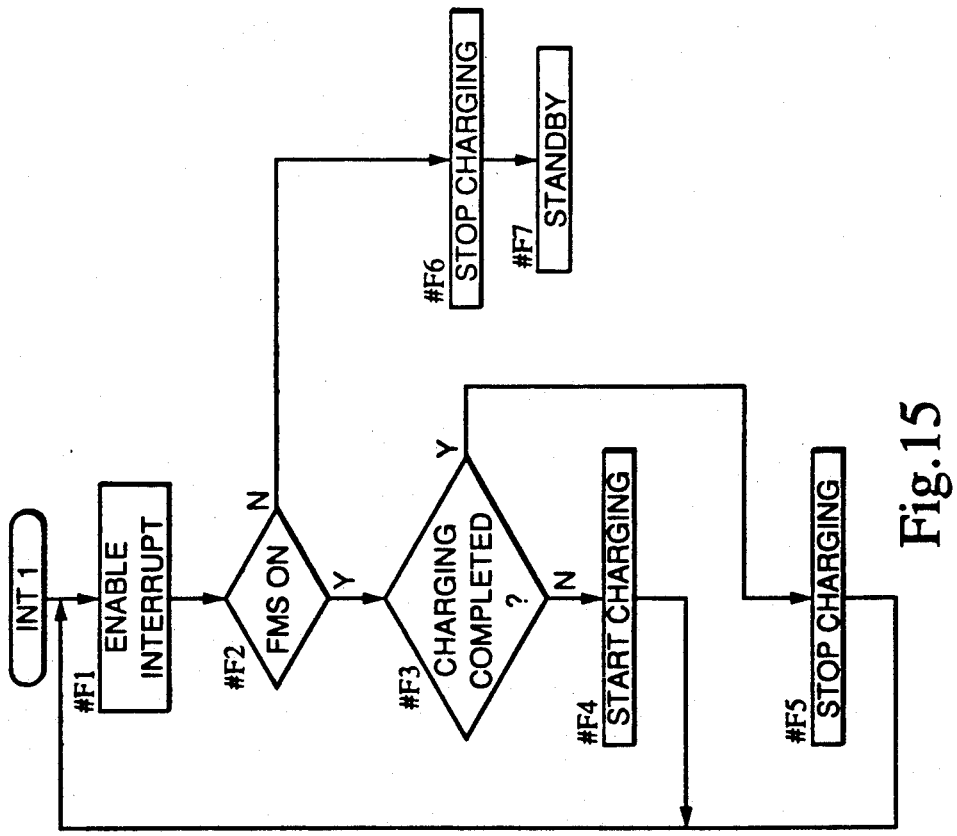

A flash main switch FMS is provided for the changing over between emission and no emission of flashlight of the external flash device OFL. The flash main switch FMS is connected to a terminal $P_{F1}$ of the microcomputer CPUF and also to a pulse gererator PG. Each time the flash main switch FMS is switched from an off-state to an on-state, a pule of a "Low" level is produced by the pulse generator PG and inputted as an interrupt signal to an interrupt terminal $INT_F$ of the in-flash microcomputer CPUF. In reponse to such interrupt signal, the in-flash microcomputer CPUF executes interrupt processing INT1 (refer to FIG. 15) which will be hereinafter described.

It is to be noted that the in-body microcomputer CPUB outputs, when it attempts to perform communications of data with the in-flash microcomputer CPUF, a flash selection signal CSFL of a "Low" level from the connecting terminal TM1 to the in-flash microcomputer CPUF, and when the signal CSFL is received, that is, when a signal line over which the signal CSFL is transmitted changes from a "High" level to a "Low" level, the in-flash microcomputer CPUF executes interrupt processing INT2 (refer to FIG. 16) which will be hereinafter described.

A bounce switch FBS is connected to a terminal $P_{F2}$ of the in-flash microcomputer CPUF. The switch FBS is turned on when the orientation or angle of the light emitting element not shown (flashlight projecting direction) is changed in order to cause flashlight to be reflected by a wall, a ceiling, a floor or some other face around the camera to indirectly illuminate an object to be photographed.

A switch FOS is turned on when flashlight photographing is to be performed in an off-camera condition, that is, in a condition wherein the external flash device is separated from the camera body. The switch FOS may be a normally closed switch which is provided, for example, in the neighborhood of a shoe (not shown) when the external flash device OFL and is turned off when the external flash device OFL is mounted onto the hot shoe (not shown) of the camera body.

It is to be noted that also the terminals $P_{F1}$ to $P_{F4}$ of the in-flash microcomputer CPUF are pulled up by way of respective resistors not shown in a similar manner as the terminals $P_1$ to $P_9$ of the in-body microcomputer CPUB.

Description of the hardware construction of the camera system to which the present invention is applied is thus completed, and in the following, software construction of the camera system will be described with reference to flow charts shown in FIGS. 3 to 16.

Figure 3:
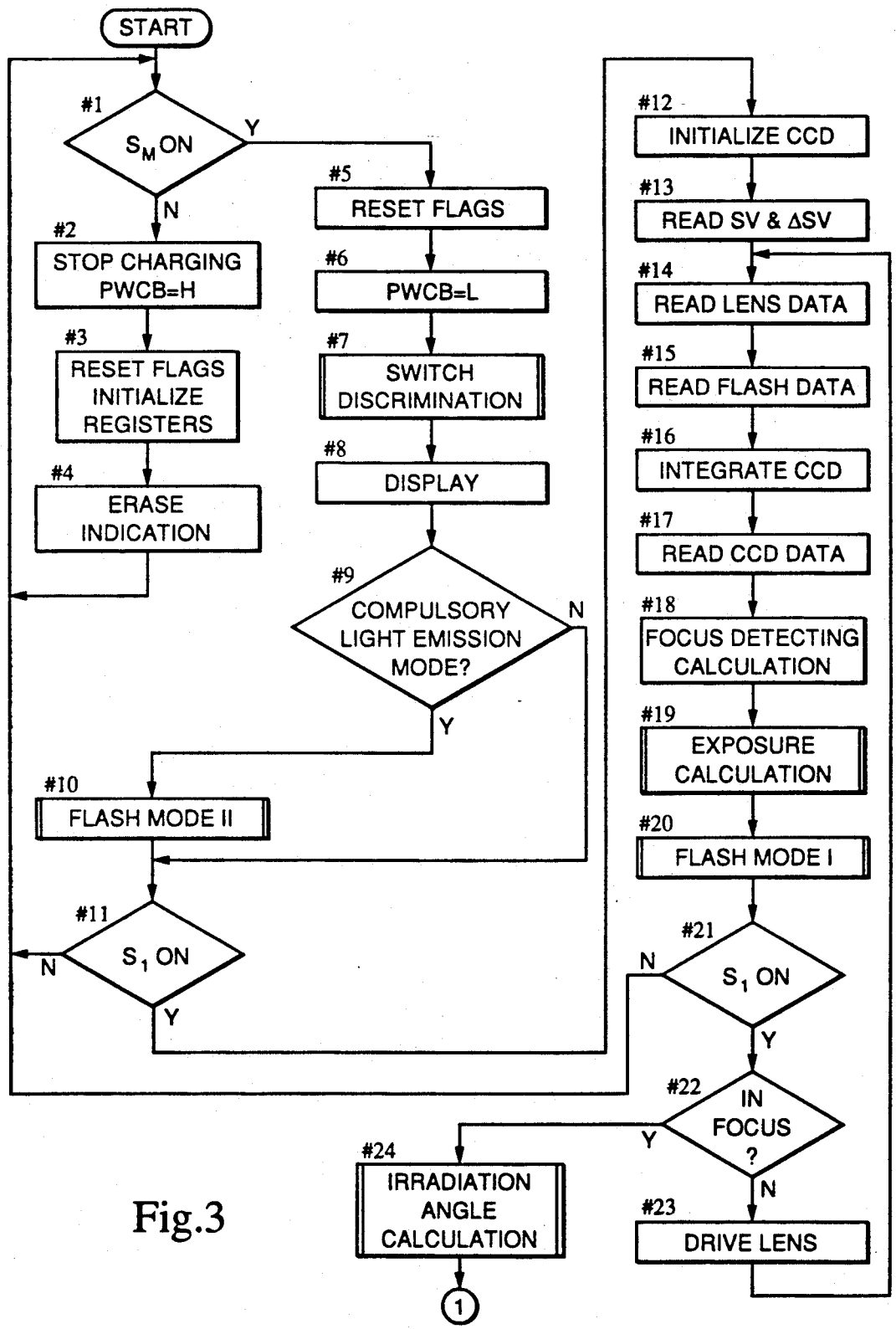
FIGS. 3 to 16 are flow charts showing operation of the camera system shown in FIG. 1.

When a power source battery EB is loaded in position into the camera body, the in-body microcomputer CPUB is power-on reset and starts its processing from a step denoted at #1 in FIG. 3. Referring to FIG. 3, it is first judged at step #1 whether or not the main switch $S_M$ is in an on-state. If the main switch $S_M$ is not on at step #1, then a charging operation is stopped and the terminal PWCB is changed to a "High" level to stop operation of the boosting circuit DDB at step #2 in order to prevent such a condition that the main switch $S_M$ may be turned off during a charging operation. After then, at step #3, various flags are reset and initial values are set to various registers, and then at step #4, data for clearing an indication are transferred to the display circuits DSP and FIN, whereafter the sequence returns to step #1. The loop is repeated while the main switch $S_M$ remains in an off-state. It is to be noted that the registers may alternatively maintain previously stored values therein.

On the other hand, in case the main switch $S_M$ is on at step #1, the flags are reset at step #5, and then the terminal PWCB is changed to a "Low" level to render the boosting circuit DDB operative at step #6. Then at step #7, a routine for the discrimination of the switches (refer to FIG. 13) is executed, and then at step #8, display data are transmitted to the display circuits DSP and FIN, whereafter the sequence advances to step #9. At step #9, it is judged whether or not the current flash mode is the compulsory light emission mode. If it is judged at step #9 that the current flash modes is the compulsory light emission mode, then a subroutine of a flash mode II (refer to FIG. 5) is executed at step #10, and then the sequence advances to step #11. On the other hand, if the current flash mode is not the compulsory light emission mode at step #9, then the subroutine at step #10 is skipped and the sequence directly advances to step #11. At step #11, it is judged whether or not the photographing preparation switch $S_1$ is in an on-state. If the photographing preparation switch $S_1$ is not on at step #11, then the sequence returns to step #1 so that such a sequence of operations as described above may be repeated again. It is to be noted that the sequence may otherwise advance to step #1 in case no switch is operated for a predetermined interval of time while the switch $S_M$ remains in an on-state (automatic power-off function) similarly as in the case when the switch $S_M$ is turned off.

If the photographing preparation switch $S_1$ is in an on-state at step #11, then the charge coupled device CCD is initialized to remove excessive charge from the charge coupled device CCD at step #12. Then at step #13, the in-body microcomputer CPUB reads an ISO sensitivity SV of a film from the film sensitivity reading circuit ISD and also reads an exposure compensation amount $\Delta SV$ from the exposure compensation amount setting circuit EMS. Then at steps #14 and #15, lens data and flash data are read in from the lens circuit LEC and the external flash device OFL, respectively. Subsequently at step #16, an integrating operation of the charge coupled device CCD is performed, and then at step #17, data of the charge coupled device CCD converted from an analog value into a digital value are taken in, whereafter a focus detecting calculation is executed at step #18. After the focus detecting calculation, a subroutine or an exposure calculation (refer to FIG. 8) is executed at step #19. After then, a subroutine of a flash mode I (refer to FIG. 5) is executed at step #20. Then, after display data are transferred to the display circuits DSP and FIN, it is judged at step #21 whether the photographing preparation switch $S_1$ is in an on-state or in an off-state. If the photographing preparation switch $S_1$ is not in an on-state at step #21, then the sequence returns to step #1. But on the contrary, if the photographing preparation switch $S_1$ remains in an on-state, then it is judged at step #22 whether or not the photographing lens is in an in-focus condition. If it is not judged at step #22 that the photographing lens is in an in-focus condition, then the focusing lens is driven, at step #23, in accordance with a result of the focus detection obtained at step #18, whereafter the sequence returns to step #14 so that the loop may thereafter be repeated until an infocus condition is reached. If the photographing preparation switch $S_1$ is turned off during execution of the loop, then the sequence returns from step #21 to step #1. If an in-focus condition is judged at step #22, then a subroutine for calculating an irradiation angle of flashlight (refer to FIG. 12) is executed at step #24.

Figure 4:
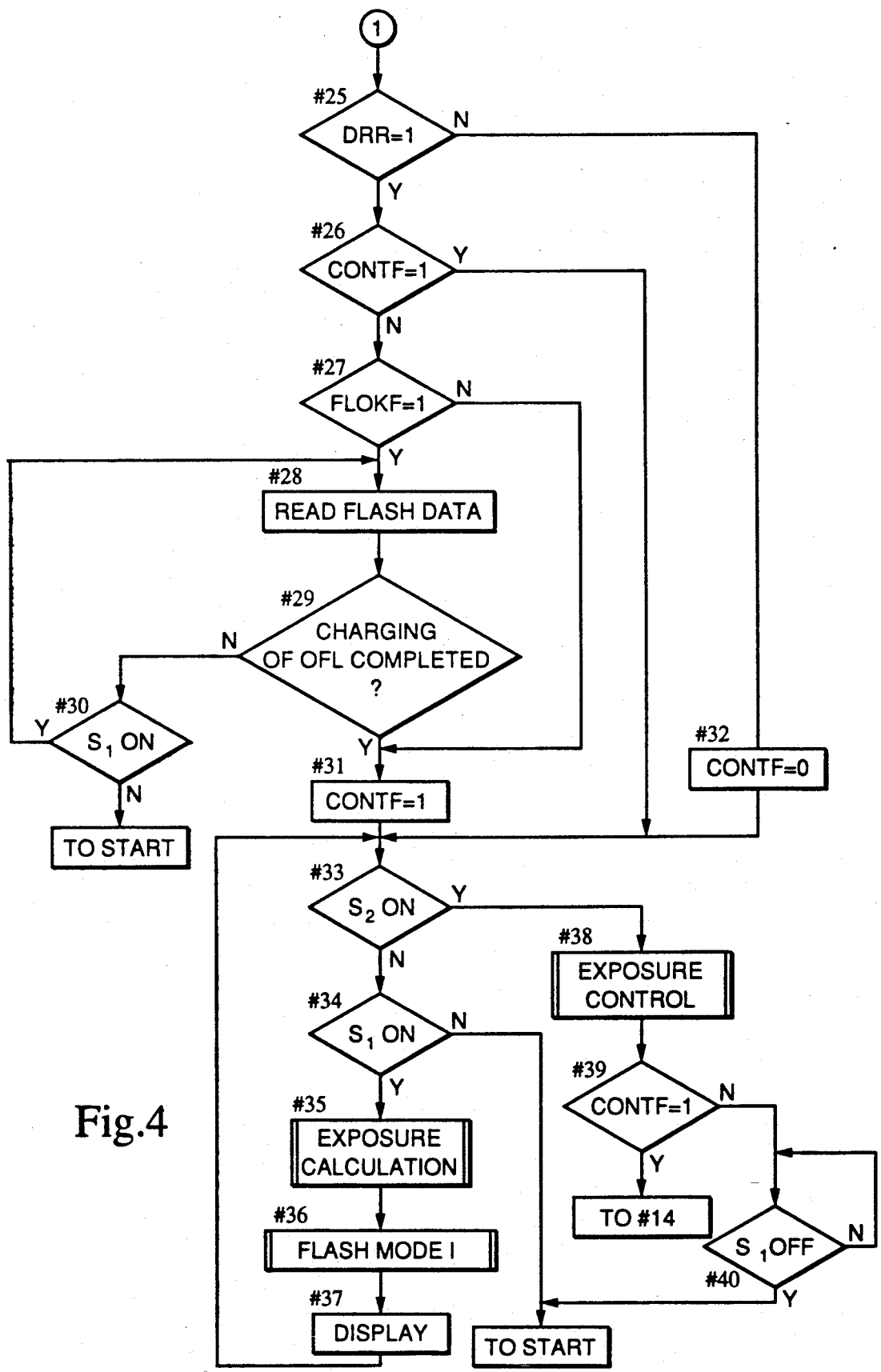

Subsequently, referring now to FIG. 4, it is judged at step #25 whether or not the current drive mode is the successive photographing mode. When the current drive mode is the successive photographing mode, a drive mode register DRR has a value DRR=1 as hereinafter described. If the current drive mode is the successive photographing mode (DRR=1) at step #25, then it is judged, at step #26, from a successive photographing flag CONTF whether or not a photograph to be taken is the first photograph in successive photographing. If the photograph to be taken is the first photograph in successive photographing, then the flag CONTF has a value CONTF=0, but if the photograph to be taken is a second or following photograph in successive photographing, then CONTF=1. In the case of CONTF=0 at step #26, this means that the photograph to be taken is the first photograph in successive photographing, and accordingly, it is subsequently judged at step #27 whether or not a flag FLOKF is equal to 1. Here, the flag FLOKF is a flash OK flag which represents, when it has a value equal to 1, that emission of flashlight is required and the external flash device OFL is enabled to operate. If FLOKF=1 at step #27, then flash data are taken in from the external flash device OFL at step #28, and then at step #29, it is judged from the flash data whether or not the external flash device OFL has been charged up. If it is not judged at step #29 that charging of the external flash device OFL has been completed, then it is judged at step #30 whether or not the switch $S_1$ is in an on-state. If the switch $S_1$ is on at step #30, the sequence returns to step #28, but on the contrary if the switch $S_1$ is off, then the sequence returns to step #1. Here, the reason why a state of the switch $S_1$ is checked is that it is intended to make it possible to set an exposure control mode or the like during charging of the external flash device OFL. If it is judged at step #29 that the external flash device OFL has been charged up, then the flag CONTF is set to CONTF=1 at step #31, and then the sequence advances to step #33. In case FLONKF=0 at step #27, the steps #28 and #29 for the judgment of completion of charging of the external flash device OFL are skipped and the sequence advances directly to step #31. On the other hand, in case CONTF=1 at step #26, this means that the photograph to be taken is a second or following photograph in successive photographing, and thus, the sequence directly advances to step #33. Accordingly, when the camera is in the successive photographing mode, the external flash device OFL is used in priority for the photographing of the first frame. On the other hand, if the camera is not in the successive photographing mode, that is, in the case of DRR=0, the successive photographing flag CONTF is reset at step #32, whereafter the sequence advances to step #33.

At step #33, it is judged whether or not the release switch S2 is in an on-state. If the release switch S2 is not on at step #33, then it is judged at step #34 whether or not the photographing preparation switch S1 is in an on-state. If the photographing preparation switch S1 remains in an on-state at step #34, then the subroutine of the exposure calculation (refer to FIG. 8) is executed at step #35, and then at step #36, the subroutine of the flash mode I (refer to FIG. 5) is executed. Then, display data are transferred to the display circuits DSP and FIN, and then the sequence returns to step #33. Accordingly, after an infocus condition is determined at step #22, focus locking is performed by keeping the switch $S_1$ in an on-state. If the photographing preparation switch S1 is not on at step #34, then the sequence returns to step #1 of FIG. 3. On the other hand, if the release switch $S_2$ is in an on-state at step #33, then the subroutine of exposure control (refer to FIG. 10) is executed at step #38, and at step #39, it is judged whether or not the successive photographing flag CONTF is equal to 1. If CONTF=1 at step #39, that is, if the camera is in the successive photographing mode, then the sequence returns to step #14 of FIG. 3. Accordingly, in the successive photographing mode, photographing is performed successively by keeping the release button in a depressed condition to the second depth. On the other hand, in the case of CONTF=0 at step #39, that is, when the camera is in the single photographing mode, the sequence returns to step #1 after it is waited that the switch $S_1$ is turned off.

Subsequently, the subroutines will be described individually.

Figure 5:
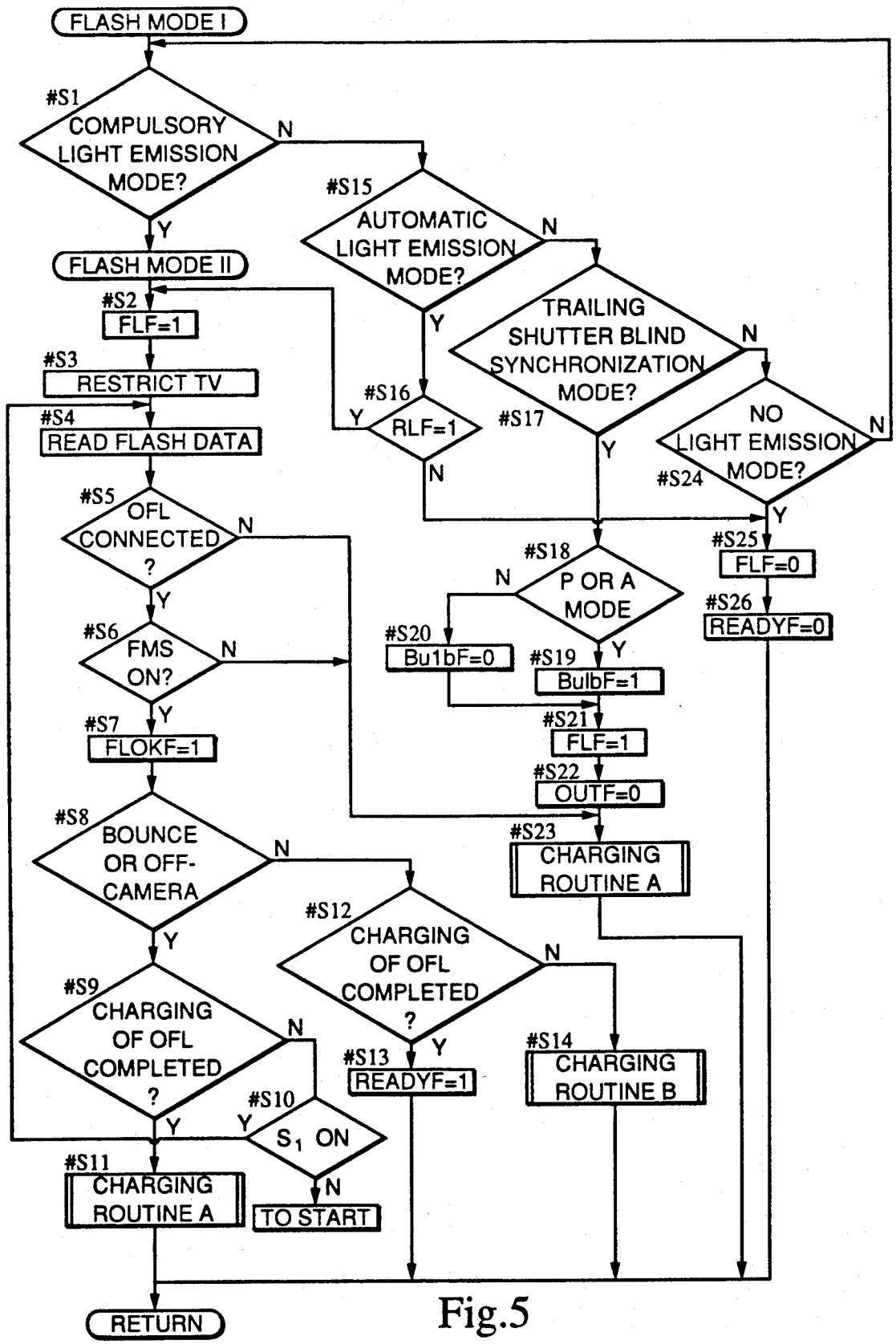

FIG. 5 illustrates the subroutines of the flash modes I and II. First, in case the subroutine of the flash mode I is called, a current flash mode is first discriminated from a value of a flash mode register FMR (refer to FIG. 13) at steps #S1, #S15, #S17 and #S24. In particular, at step #1, it is judged whether or not the current flash mode is the compulsory light emission mode. If the current flash mode is the compulsory light emission mode, then the sequence advances into the subroutine of the flash mode II. In the subroutine of the flash mode II, a flag FLF which indicates, when it is equal to 1, that flashlight should be emitted is set to 1 at step #S2, and then, when the camera is in the P or A mode, if the shutter speed is higher than a synchroinization speed $TV_X$, then the shutter speed TV is restricted or set to the synchronizaton speed $TV_X$ at step #S3. It is to be noted that it may be notified to a photographer that the shutter speed should be set, when the camera is in the S or M mode, to a value lower than the synchronization speed $TV_X$. Then at step #S4, flash data are read in from the external flash device OFL, and then presence or absence of the external flash device OFL is judged from the flash data at step #S5. If it is judged at step #S5 that the external flash device OFL is mounted on the camera body, then it is judged from the flash data at step #S6 whether or not the flash main switch FMS is in an on-state. If it is judged at step #S6 that the flash main switch FMS of the external flash device OFL is on, then since the external flash device OFL can operate, the flash OK flag FLOKF is set to 1 at step #S7. Subsequently at step #S8, it is judged whether the bounce switch FBS is in an on-state or the off-camera switch FOS is in an on-state. In case the bounce switch FBS is on or the off camera switch FOS is on at step #S8, it is judged at step #S9 whether or not charging of the external flash device OFL has been completed, and if charging has not been completed, then it is judged at step #S10 whether or not the switch $S_1$ is in an on-state. Then, while the switch $S_1$ remains in an on-state, the loop of the steps #S4 to #S9 is repeated until charging of the external flash OFL is completed. On the other hand, if the switch $S_1$ is turned off, then the sequence returns from step #S to step #1. On the other hand, in case charging of the external flash device OFL is completed at step #S9, a charging routine A (refer to FIG. 6) is executed at step #S11, whereafter the sequence returns to an original step at which the present subroutine has been called.

Meanwhile, in case the bounce switch FBS is in an off-state and the off-camera switch FOS is in an off-state at step #S8, that one of the external flash device OFL and internal flash device IFL which has been charged up precedently to the other is caused to emit light. To this end, it is judged at step #12 whether charging of the external flash device OFL has been completed, and if charging has been completed, then a charging completion flag READYF is set to 1 at step #S13, whereafter the sequence returns to the original step at which the present subroutine has been called. If charging of the external flash device OFL has not yet been completed at step #S12, then a charging routine B (refer to FIG. 7) is executed at step #S14, whereafter the sequence returns to the original step.

On the other hand, if the external flash device OFL is not connected to the camera body at step #S5, or if the external flash device OFL is connected to the camera body at step #S5 and yet the flash main switch FMS of the external flash device OFl is not in an on-state at step #S6, the charging routine A (refer to FIG. 6) is executed at step #S23, whereafter the sequence returns to the original step.

In the meantime, if the current flash mode is not the compulsory light emission mode at step #S1, then it is judged at step #S15 whether or not the current flash mode is the automatic light emission mode, and if the current flash mode is the automatic light emission mode, then it is judged at step #S16 whether or not a backlight flag RLF, which will be hereinafter described, is equal to 1. If the backlight flag RLF is equal to 1 at step #S16, then the sequence enters the subroutine of the flash mode II to perform the same operation as in the compulsory light emission mode described hereinabove. On the contrary, if the backlight flag RLF is not equal to 1 at step #S16, then since this means that a main object to be photographed is not in a backlighted condition, the flash flag FLF is changed to 0 at step #S25 and then the charging completion flag READYF is changed to 0 at step #26, whereafter the sequence returns to the original step, similarly as in the no light emission mode described hereinbelow. It is to be noted that the processing at step #S10 may be modified such that it may be judged whether or not the brightness of an object to be photographed is excessively low, and only when the object is so dark that photographing only with ambient light may possibly result in blurring of the camera, the sequence may advance to step #S2 so as to perform flashlight photographing.

In case the current flash mode is not the automatic light emission mode at step #S15, then the sequence advances to step #S17 at which it is judged whether or not the current flash mode is the trailing shutter blind synchronization mode. If the current flash mode is the trailing shutter blind synchronization mode, then it is judged at step #S18 whether or not the current exposure control mode is the P mode or the A mode, and in case the current exposure control mode is the P mode or the A mode, a flag BulbF is changed to 1 at step #S19, whereafter the sequence advances to step #S21. On the contrary, if the current exposure control mode is not the P mode nor the A mode, then the flag BulbF is changed to 0 at step #S20, whereafter the sequence advances to step #21. Here, the flag BulbF is a flag which is set if bulb photographing is performed. At step #S21, the flash flag FLF is changed to 1, and then at step #S22, an external flash priority flag OUTF is changed to 0 at step #S22. This is because the camera system of the present embodiment uses the internal flash device IFL in the trailing shutter blind synchronization mode. After then, the charging routine A (refer to FIG. 6) is executed at step #S23, whereafter the sequence returns to the original step at which the present subroutine has been called.

In case the current flash mode is not the trailing shutter blind synchronization mode at step #S17, it is judged at step #S24 whether or not the current flash mode is the no light emission mode, and if the current flash mode is not the no light emission mode, then the sequence returns to step #S1. But if the current flash mode is the no light emission mode at step #S24, then the flash flag FLF is changed to 0 at step #S25, and then the charging completion flag READYF is changed to 0 at step #S26, whereafter the sequence returns to the original step.

Figure 6:
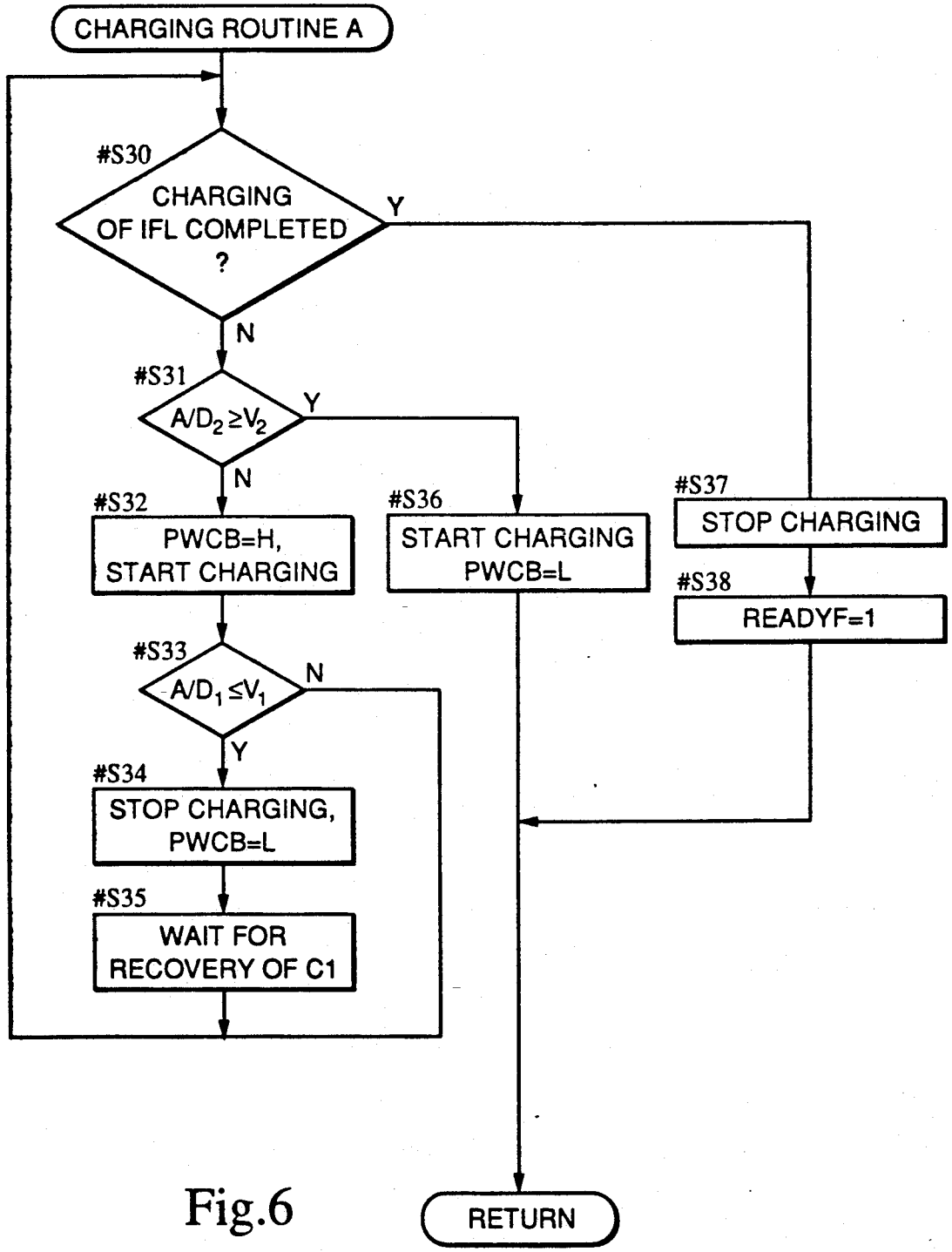

FIG. 6 illustrates contents of the charging routine A. In the subroutine, charging of the capacitor C2 is performed until charging of the internal flash device IFL is completed. If the subroutine is called, then it is first judged at step #S30 whether or not charging of the internal flash device IFL has been completed, that is, whether or not charging of the capacitor C2 has been completed. If such charging has been completed, then the charging operation is stopped at step #S37. In case charging has been completed at step #S30, normally the boosting circuit DDB is operating, and accordingly, the terminal PWCB of the inbody microcomputer CPUB presents a "Low" level. Then at step #S38, the charging completion flag READYF is changed to 1 at step #S38, whereafter the sequence returns to an original step at which the present subroutine has been called. In the meantime, if charging of the internal flash device IFL has not yet been completed at step #S30, then it is judged at step #S31 whether or not the charged voltage of the capacitor C2 for the accumulation of energy for the emission of flashlight of the internal flash device IFL is equal to or higher than a predetermined voltage $V_2$.

Figure 17:
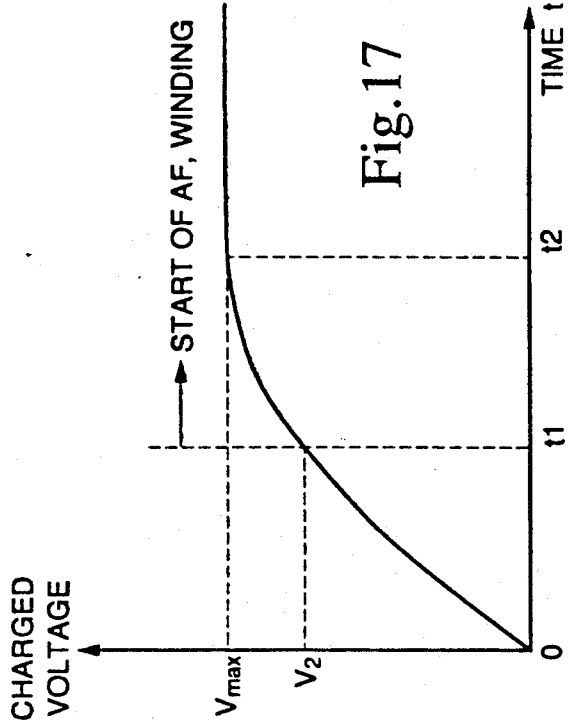
FIG. 17 is a diagram showing a variation with respect to time of a charged voltage of an internal flash device of the camera system shown in FIG. 1.

Here, significance of the predetermined voltage $V_2$ is described with reference to FIG. 17. In FIG. 17, the axis of ordinate represents a charged voltage of the capacitor C2 while the axis of abscissa represents an elapsed time after starting of charging of the internal flash device IFL. A charged up level (for example, 300 volts) of the capacitor C2 at which the internal flash device IFL can operate to emit flashlight is represented by Vmax which is reached at a point $t_2$ of time. During charging of such main capacitor of a flash device, the power source voltage presents such a wide variation that operation for the focus detection or the like may not be performed accurately or a motor may not possibly be driven accurately. Accordingly, in the prior art, a focus detecting operation or a film winding operation or the like is started only after completion of charging of the main capacitor, that is, after the point $t_2$ of time. On the other hand, in the present embodiment, only after a point $t_1$ of time by which the power source voltage has been stabilized such that a focus detecting operation can be performed accurately and a motor can be driven accurately, a focus detecting operation, a film winding operation or the like is started while the charging operation is proceeding. Accordingly, according to the present embodiment, if a focus detecting operation, a film winding operation or the like has been completed already at the point $t_2$ of time at which charging is completed, then a subsequent photographing operation can be performed immediately. Meanwhile, even if a focus detecting operation, a film winding operation or the like has not been completed yet, the waiting time can be reduced by an interval of time equal to $t_2-t_1$ comparing with that of a conventional camera system. In the camera of the present embodiment, taking notice of the fact that the power source voltage is stabilized if the charged voltage of a capacitor is high, a focus detecting operation or the like is started at the point $t_1$ of time when the charged voltage of the capacitor C2 has reached a predetermined voltage $V_2$ (for example, 250 volts) while the charging operation is proceeding.

Referring back to the charging routine A of FIG. 6, if the charged voltage of the capacitor C2 of the internal flash device IFL is equal to or higher than the operation starting voltage $V_2$ at step #S31, then charging of the capacitor C2 is started at step #S36 in order to raise the charged voltage of the capacitor C2 further to the charged up voltage Vmax. Then, the terminal PWCB is changed to a "Low" level to render the boosting circuit DDB operative so as to permit a focus detecting operation and so forth to be performed, whereafter the sequence returns to the original step. If the charged voltage of the capacitor C2 is lower than the operation starting voltage $V_2$ at step #S31, then the terminal PWCB is changed to a "High" level to stop operation of the boosting circuit DDB and charging of the capacitor C2 is started at step #S32, whereafter it is judged at step #S33 whether or not the charged voltage of the backup capacitor C1 is equal to or lower than the predetermined voltage $V_1$.

Here, the predetermined voltage $V_1$ is the lowest operation voltage of the regulator REG. In the present camera system, the power source voltage is supplied to the in-body microcomputer CPUB, display circuits DSP and FIN and interface circuit INF by way of the regulator REG so that the microcomputer CPUB and the display circuits DSP and FIN may operate until the charged voltage of the capacitor C2 of the internal flash device IFL reaches the predetermined voltage $V_2$. Thus, if the voltage of the backup capacitor C1 drops lower than the lowest operation voltage $V_1$, then the charging operation of the capacitor C2 is stopped once and the terminal PWCB is changed to a "Low" level to render the boosting circuit DDB operative at step #S34 to charge the capacitor C1 again. Then, after the charged voltage of the capacitor C1 reaches a predetermined level at which it can perform a backup function sufficiently at step #S35, the sequence returns to step #S30. In case the voltage of the backup capacitor C1 is higher than the lowest operation voltage $V_1$ at step #S33, the steps #S34 and #S35 are skipped. During charging of the capacitor C2, the loop of the steps #S30 to #S35 is repeated, and either when the charged voltage of the capacitor C2 reaches the charged up voltage Vmax at step #S30 or when the charged voltage of the capacitor C2 is equal to or higher than the operation starting voltage $V_2$ at step #S31, the sequence returns to the original step by way of step #S36.

It is to be noted that, while in the present embodiment setting of an exposure control mode or the like is disabled during charging of the capacitor C2, the charging routine A of FIG. 6 may be modified such that the subroutine of switch discrimination is executed in a route from step #S33 or #S35 back to step #S30 so that setting of an exposure control mode may be performed even during charging of the capacitor C2.

Figure 7:
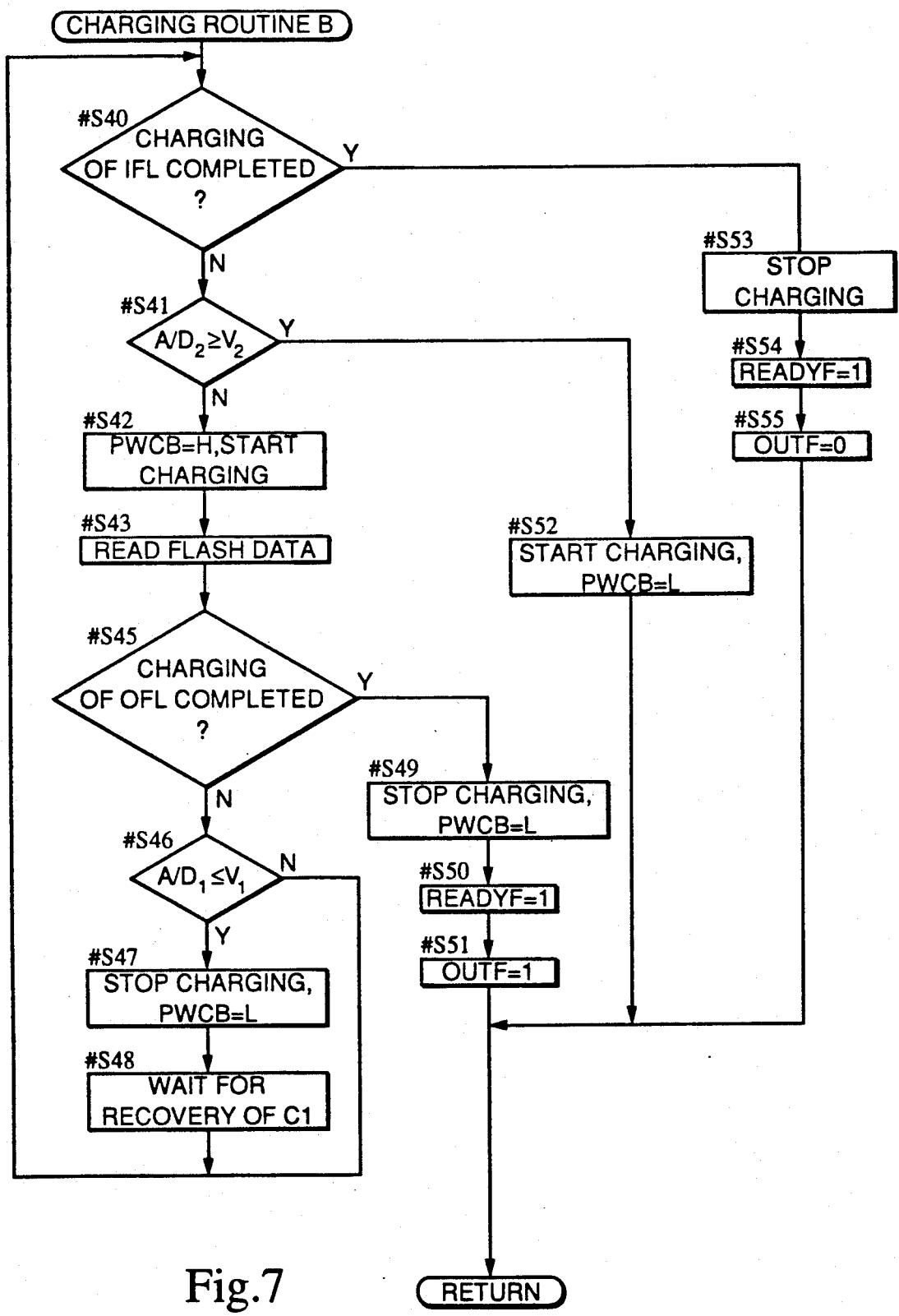

FIG. 7 illustrates contents of the charging routine B. In the subroutine, charging of the capacitor C2 is performed until charging of either one of the external flash device OFL and the internal flash device IFL is completed. Then flashlight is emitted using one of the flash devices which has completed its charging precedently to the other flash device. After the present subroutine is called, it is first judged at step #S40 whether or not charging of the internal flash device IFL has been completed. In case the internal flash device IFL has been charged up at step #S40, the charging operation is stopped at step #S53, and the charged up flag READYF is changed to 1 at step #S54. In this instance, since the internal flash device IFL has been charged up precedently to the external flash device OFL, the external flash priority flag OUTF is changed to 0 at step #S55, whereafter the sequence returns to an original step at which the present subroutine has been called. Here, the flag OUTF is a flag which is set when the external flash device OFL is to be caused to emit flashlight.

On the contrary, in case the internal flash device IFL has not been charged up yet at step #S40, it is judged at step #S41 whether or not the voltage of the capacitor C2 of the internal flash IFL is equal to or higher than the operation starting voltage $V_2$ similarly as in the charging routine A. Then, if the voltage of the capacitor C2 is equal to or higher than the operation starting voltage $V_2$, then charging of the capacitor C2 is started at step #S52 in order to further raise the voltage of the capacitor C2 to the charged up voltage Vmax. Also, the terminal PWCB is changed to a "Low" level to render the boosting circuit DDB operative, whereafter the sequence returns to the original step. On the other hand, if the charged up voltage of the capacitor C2 is lower than the operation starting voltage $V_2$ at step #S41, then the terminal PWCB is changed, at step #S42, to a "High" level to stop operation of the boosting circuit DDB and then charging is started. Subsequently at step #S43, flash data are read in from the external flash device OFL, and at step #S45, it is judged whether or not the external flash device OFL has been charged up. If charging of the external flash device OFL has been completed at step #S45, then the charging operation of the internal flash device IFL is stopped at step #S49, whereafter the terminal PWCB is changed to a "Low" level to render the boosting circuit DDB operative. Then, the charged up flag READYF is changed to 1, and since the external flash device OFL has been charged up precedently to the internal flash device IFL, the external flash priority flag OUTF is changed to 1 at step #S51, whereafter the sequence returns to the original step. If the external flash device OFL has not been charged up yet at step #S45, it is judged at step #S46 whether or not the voltage of the backup capacitor C1 is equal to or lower than the lowest operation voltage $V_1$ of the regulator REG. If the voltage of the backup capacitor C1 is equal to or lower than the lowest operating voltage $V_1$ at step #S46, then at step #S47, charging of the capacitor C2 of the internal flash device IFL is stopped and the terminal PWCB is changed to a "Low" level to render the boosting circuit DDB operative to charge the capacitor C1 again. Then, after the charged voltage of the capacitor C1 reaches such a predetermined value, at step #S48, that it can perform a backup function sufficiently, the sequence returns to step #S40. If the voltage of the backup capacitor C1 is not equal to nor lower than $V_1$ at step #S46, then the sequence returns directly to step #40 bypassing the steps #S47 and #S48. During charging of the capacitor C2, the loop of the steps #S40 to #S48 is repeated until either the charged voltage of the capacitor C2 reaches the charged up voltage Vmax at step #S40 or the charged voltage of the capacitor C2 is equal to or higher than the operation starting voltage $V_2$ at step #S41 or else the external flash device OFL is charged up at step #S45, whereupon the sequence returns to the original step. It is to be noted that the switch discrimination routine may otherwise be executed when the sequence returns from the step #S46 or #S48 to step #S46 similarly as in the charging routine A.

Figure 8:
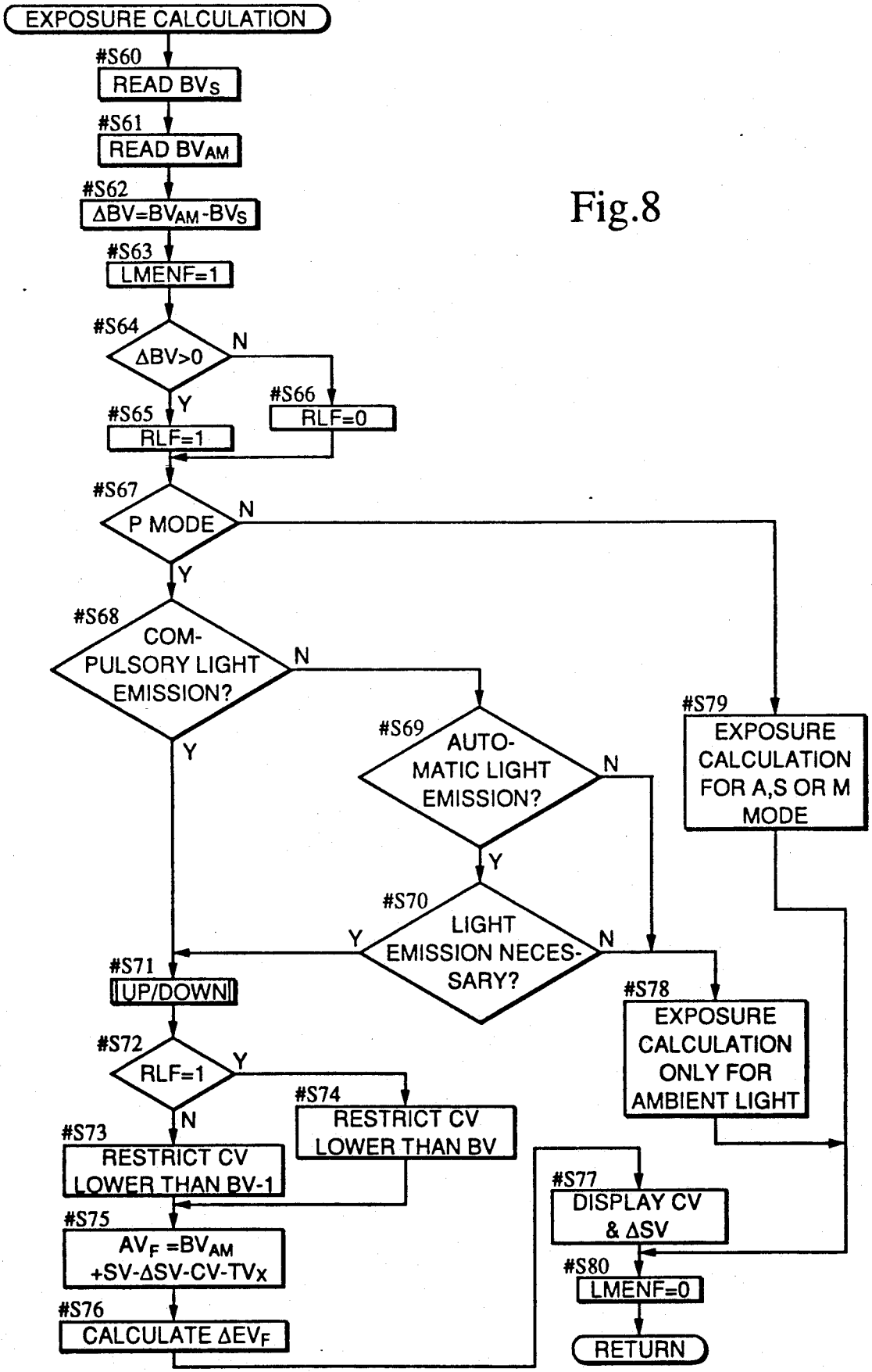

FIG. 8 illustrates the subroutine of the exposure calculation. After the subroutine is called, a brightness BVs at a central portion of a screen to be photographed is first read in from the light measuring circuit LMC at step #S60, and then at step #S61, a brightness $BV_{AM}$ at another portion or peripheral portion of the screen other than the central portion is read in from the light measuring circuit LMC. After then, a brightness difference $\Delta BV$ ($=BV_{AM}-BV_S$) between the central portion and the peripheral portion is calculated at step #S62, and then a light measurement completion flag LMENF is set to 1 at step #S63. Subsequently, it is judged at step #64 whether or not the brightness difference $\Delta BV$ is $\Delta BV>0$, that is, whether or not the main object to be photographed is in a backlighted condition. In case $\Delta BV>0$ at step #S64, then it is determined that the main object is in a backlighted condition, and the backlight flag RLF is changed to 1 at step #S65, whereafter the sequence advances to step #S67. On the contrary, if $\Delta BV \leq 0$ is judged at step #S64, then it is judged that the main object is in a regularly lighted condition, and the backlight flag RLF is changed to 0 at step #S66, whereafter the sequence advances to step #67. At step #S67, it is judged whether or not the current exposure control mode is the P mode, and then, if the current exposure control mode is not the P mode, then the sequence advances to step #S79 at which an exposure calculation is executed in accordance with an aperture value and/or a shutter speed set for the A mode, S mode or M mode. Then, the light measurement completion flag LMENF is charged to 0 at step #S80, whereafter the sequence returns to an original step at which the present subroutine has been called.

On the other hand, if the current exposure control mode is the P mode, then it is judged at step #S68 whether or not the current flash mode is the compulsory light emission mode. If the current flash mode is not the compulsory light emission mode, then it is judged at step #S69 whether or not the current flash mode is the automatic light emission mode, and in case the current flash mode is the automatic light emission mode, then the sequence advances to step #S70 at which it is judged whether or not flashlight is to be emitted. In case, at step #S70, either the backlight flag RLF is in a set-state or the brightness value $BV_S$ at the central portion of the screen to be photographed is lower than a predetermined value (or else a value which varies in response to a focal length of the lens), it is judged that flashlight should be emitted, and the sequence advances to step #S71. Otherwise, flashlight photographing should not be performed, and accordingly, the sequence advances to step #S78 at which an exposure calculation is executed in accordance only with ambient light, whereafter the sequence advances to step #S80. On the other hand, if the current flash mode is not the automatic light emission mode at step #S69, the sequence advances directly to step #78. Meanwhile, if the current flash mode is the compulsory light emission mode at step #68, the sequence advances to step #S71.

Figure 14:
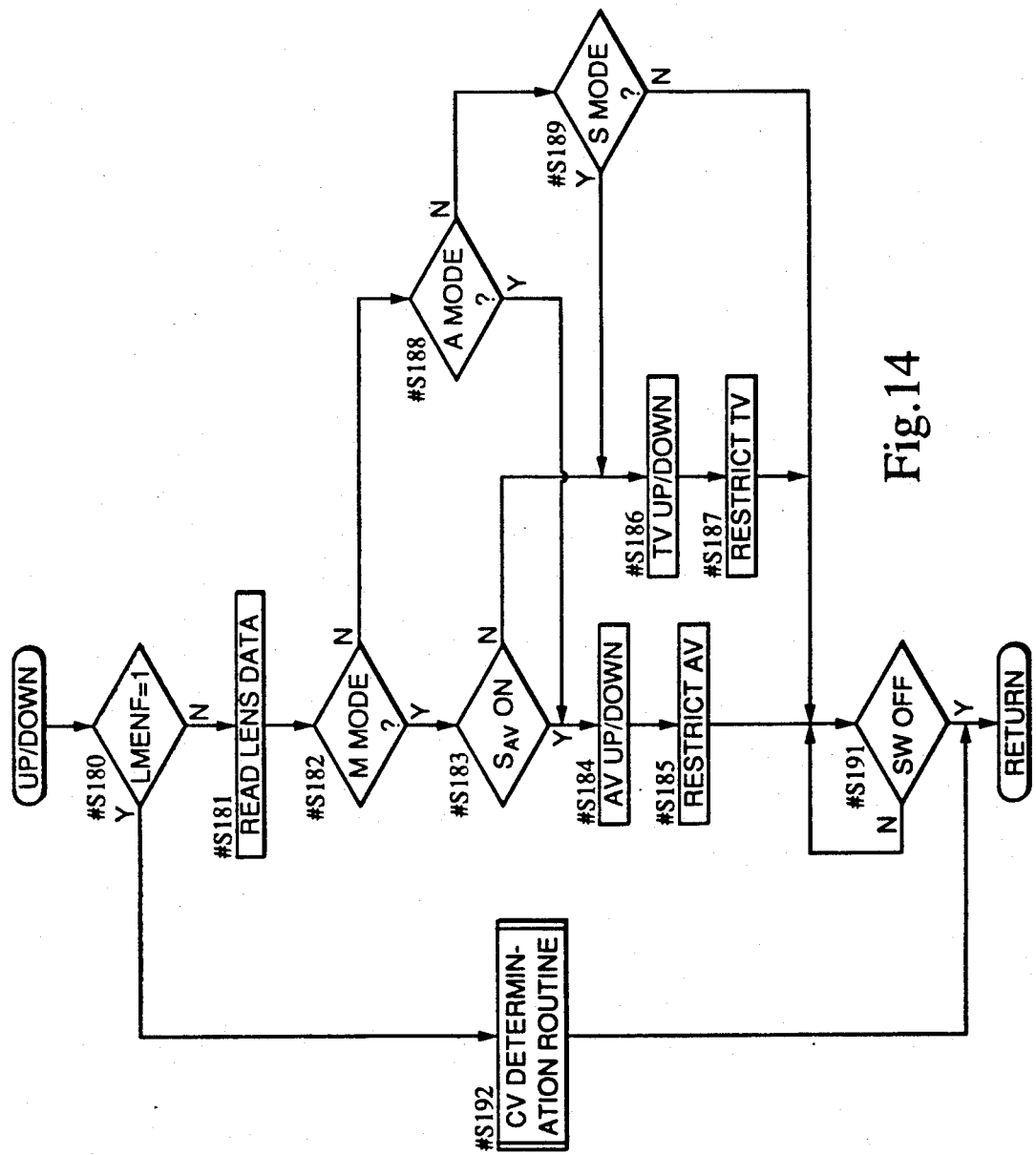

Subsequently, the exposure calculation (steps #S71 to #S77) for a case wherein emission of flashlight is to be performed will be described. At step #S71, an up/down subroutine illustrated in FIG. 14 is called. Referring to FIG. 14, since light measurement has been completed already (LMENF=1) here, the sequence advances from step #S180 to step #S192. At step #S192, a CV determination routine is executed to determine a contrast (CV value) between the central portion and the peripheral portion of the screen to be photographed, whereafter the sequence returns to an original step at which the up/down routine has been called, that is, to step #S71 of FIG. 8.

Figure 9:
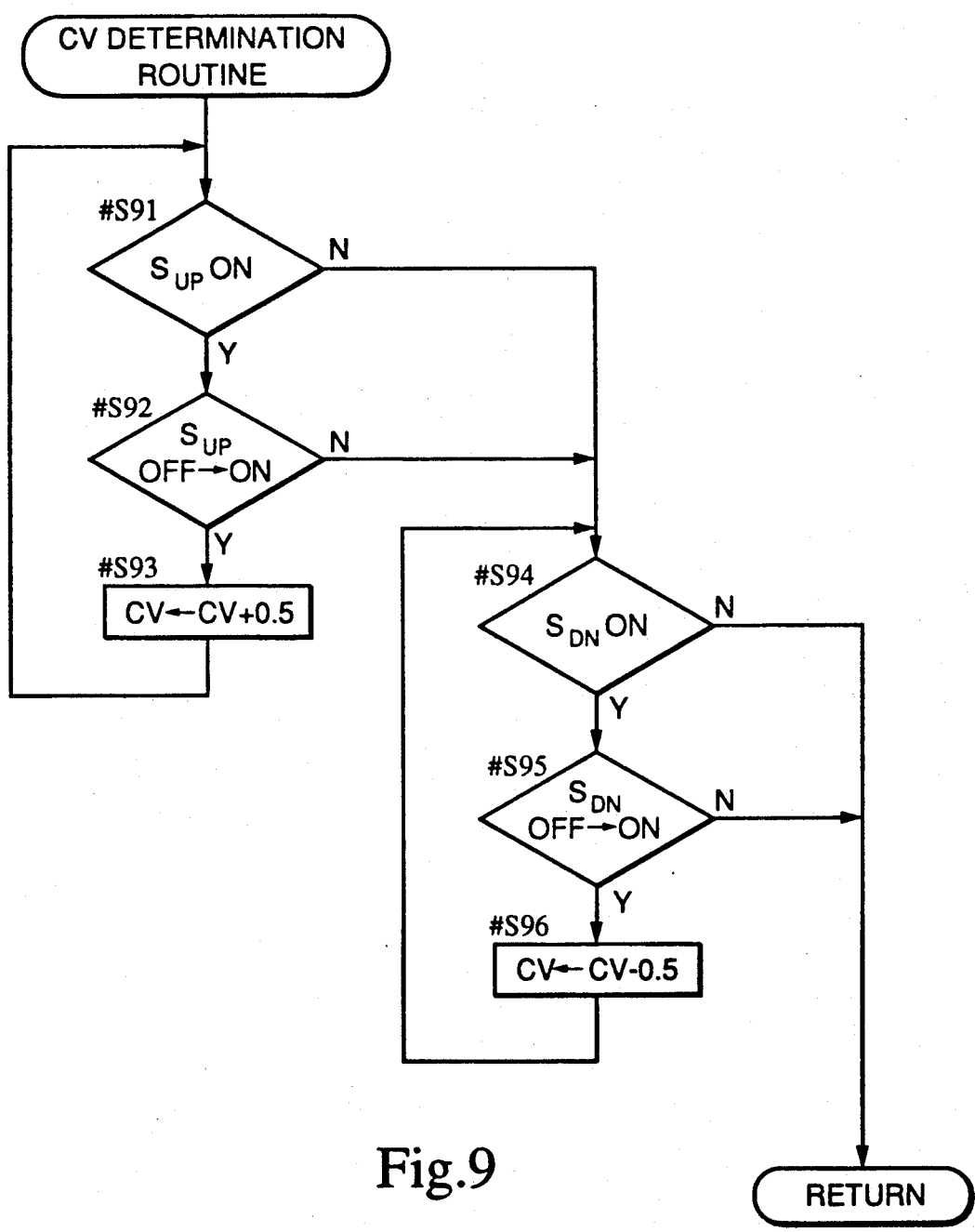

Here, the CV determination routine will be described with reference to FIG. 9. After the routine is entered, the in-body microcomputer CPUB judges at step #S91 whether or not the up switch $S_{UP}$ is in an on-state, and in case the up switch $S_{UP}$ is on, it is judged at step #S92 whether the up switch $S_{UP}$ has changed from an off-state to the on-state. Then, in case the up switch $S_{UP}$ has changed from an off-state to the on-state, the sequence advances to step #S83 at which the CV value is increased by 0.5 steps (0.5 EV), whereafter the sequence returns to step #S91. In case the up switch $S_{UP}$ is in an off-state at step #S91, or in case the up switch $S_{UP}$ is maintained in an on-state at step #S92, the sequence advances to step #S94. In short, the CV value is increased by +0.5 EV only when the up switch $S_{UP}$ is changed from an off-state to an on-state. At step #S94, it is judged whether or not the down switch $S_{DN}$ is in an on-state, and if the down switch $S_{DN}$ is on, then it is judged at step #S95 whether or not the down switch $S_{DN}$ has been changed from an off-state to the on-state. Similarly as in the case of the up switch $S_{UP}$, only when the down switch $S_{DN}$ has been changed from an off-state to an on-state, the CV value is decreased by 0.5 steps (0.5 EV) at step #S96. In case the down switch $S_{DN}$ is in an off-state at step #S94 or in case the down switch $S_{DN}$ is maintained in an on-state at step #S95, the sequence returns to an original step at which the CV determination routine has been called, that is, to step #S192 of FIG. 14 in this instance.

A CV value determined in the CV determination routine represents a difference of steps in exposure value between a peripheral portion of a screen to be photographed which is not irradiated with flashlight upon flashlight photographing and a central portion of the screen which is irradiated with flashlight, that is, by how many steps the peripheral portion should be exposed at a higher exposure level than the central portion. The CV value will be described with reference to FIGS. 18. It is to be noted that, while FIG. 18 illustrates a calculation of a CV value when a main object to be photographed is in a backlighted condition, this also applies to that when a main object is in a regularly lighted condition.

Figure 18:
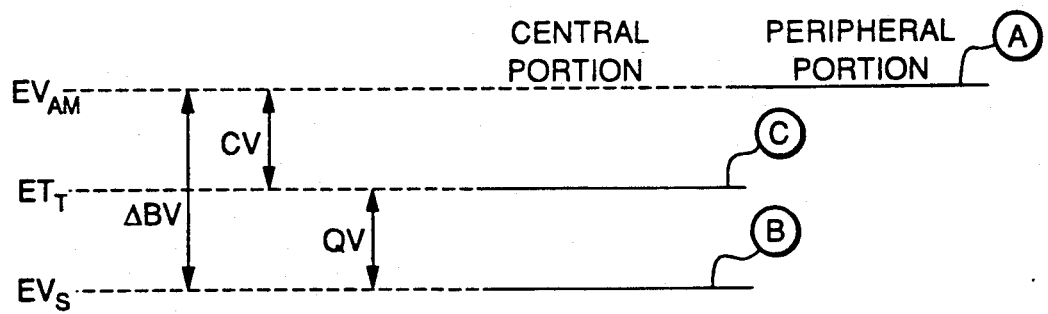
FIG. 18 is a diagrammatic representation illustrating exposure values at a peripheral portion and a central portion of a screen to be photographed.

FIG. 18 illustrates exposure values at a peripheral portion and a central portion of a screen to be photographed in an APEX system. Referring to FIG. 18, lines A and B indicate exposure values $EV_{AM}$ ($=BV_{AM}+SV$) and $EV_S$ ($=BV_S+SV$) at a peripheral porrtion and a central portion, respectively, of a screen to be photographed upon ambient light photographing. Meanwhile, the remaining line C indicates an exposure value $EV_T$ at the central portion of the screen when flashlight is spot projected only to the central portion, and where an exposure value only with flashlight projected is represented by QV, then $$EV_T = EV_S + QV.$$

If flashlight is spot projected only to the central portion of the screen, the peripheral portion is not irradiated with the flashlight. Accordingly, the CV value can be set arbitrarily by controlling exposure with ambient light in accordance with the brightness $BV_{AM}$ at the peripheral portion to control flashlight. Subsequently, control of flashlight for obtaining an arbitrarily set CV value will be described.

Now, a shutter speed and an aperture value determined in accordance with the peripheral brightness $BV_{AM}$ are represented by TV and AV, respectively. Since the central portion is exposed by an exposure compensation amount $\Delta SV$ than its appropriate value, the amount of light necessary for the central portion is given by $$2^{TV+AV+\Delta SU}.$$

Meanwhile, the amount of ambient light coming to the central portion is given by $$2^{BUS+SU}.$$

Accordingly, the amount of flashlight necessary for the central portion is given by $$2^{TV+AV+\Delta SU} - 2^{BUS+SU}.$$

By the way, when the peripheral portion is to be exposed more by an amount CV than the central portion, it is exposed more by an amount equal to $\Delta SV+CV$ than its appropriate value. Accordingly, the amount of light necessary for the peripheral portion is given by $$2^{TV+AV+SV+CV}.$$

However, because the peripheral portion is exposed only with ambient light, the following relationship stands:

$$2^{TV+AV+\Delta SV+CV} = 2^{BVAM+SV}$$
$$\therefore 2^{TV+AV+\Delta SV} = 2^{BVAM+SV-CV}$$

Accordingly, the amount of flashlight necessary for the central portion is given by $$2^{BVAM+SV-CV} - 2^{BVS+SV}.$$

It can be apparently seen from the last expression that, if a CV value is determined, then a necessary amount of flashlight is determined decisively.

Subsequently, a necessary amount of flashlight will be investigated.

Of the amount of light $$2^{TV+AV+\Delta SV}$$

necessary for the central portion, the ratio of the amount of flashlight $$2^{TV+AV+\Delta SV} - 2^{BVS+SV}$$

is given by $$\frac{2^{TV+AV+\Delta SV} - 2^{BVS+SV}}{2^{TV+AV+\Delta SV}} = 1 - \frac{2^{BVS+SV}}{2^{BVAM+SV-CV}}$$
$$= 1 - 2^{BVS+SV-(BVAM+SV-CV)}$$
$$= 1 - 2^{CV-(BVAM-BVS)}$$
$$= 1 - 2^{CV-\Delta BV}$$

the relationship is indicated by graphs in FIGS. 19a and 19b. It is to be noted that an upper curve in FIG. 19a represents the relationship when the main object is in a backlighted condition ($\Delta BV>0$) while an upper curve in FIG. 19b represents the relationship when the main object is a regularly lighted condition ($\Delta BV \leq 0$). As apparently seen from the curves, as the exposure amount at the central portion with respect to that at the peripheral portion increases, the necessary amount of flashlight increases. Further, in case the CV value is set to the difference $\Delta BV$ between the peripheral portion brightness $BV_{AM}$ and the central portion brightness $BV_S$, no flashlight is required at all, and a desired contrast ($CV=\Delta BV$) can be obtained by photographing only with ambient light. Then, it is impossible to make the difference (contrast) in exposure amount between the peripheral portion and the central portion greater than a difference in brightness between the peripheral portion and the central portion (that is, to project flashlight to the central portion to further make the central portion darker), and accordingly, $CV \leq \Delta BV$.

It is to be noted that curves shown below the two curves indicate a relationship between the CV value and an adjusted light amount compensation amount $\Delta EV_F$ for obtaining the necessary amount of flashlight. The adjusted light amount compensation amount $\Delta EV_F$ is represented by a logarithm of a value indicative of a ratio of an amount of flashlight to a necessary amount of light and is given by $$\Delta EV_F = \log_2(1 - 2^{CV-\Delta BV}).$$

When the ratio of the amount of flashlight is, for example, ½ as seen from the lower curve in FIG. 19b, $\Delta EV_F = -1$, and accordingly, the adjusted light amount level should be corrected by one step to the under side. Meanwhile, when the ratio of the flashlight amount is 1, that is, when the necessary amount of light is to be obtained only from flashlight (for example, when the central portion is the true darkness ($\Delta BV = -\infty$) or when the peripheral portion is to be exposed to the deep black ($CV = -\infty$)), $\Delta EV_F = 0$, and accordingly, no compensation of the adjusted light amount is required. Then, in case the ratio of the flashlight amount is 0, that is, when exposure is to be performed only with ambient light, $\Delta EV_F = -\infty$, that is, the adjusted light amount is corrected by $\infty$ steps to the under side so that no flashlight may be emitted at all.

It is to be noted that, as apparently seen from the expression $$1 - 2^{CV-\Delta BV}$$

representing a ratio of flashlight, the ratio of flashlight does not depend upon the exposure compensation amount $\Delta SV$ but depends only upon the brightness difference $\Delta BV$ and the contrast value CV between the peripheral portion and the central portion of the screen to be photographed. In short, the contrast only depends upon the relationship between the central portion and the peripheral portion and is quite free from absolute values (appropriate values).

Referring back to FIG. 8, after a CV value is determined at step #S71, it is judged at step #S72 whether or not a main object to be photographed is in a backlighted condition. If the backlight flag RLF is in a set state at step #S72, then the sequence advances to step #S74 at which the CV value is restricted to a value equal to or smaller than $\Delta BV$. The reason is that it is impossible to make the contrast between the peripheral portion and the central portion greater than the difference in brightness between the peripheral portion and the central portion as described hereinabove.

Meanwhile, if the backlight flag RLF is in a reset-state at step #S72, then the sequence advances to step #S73 at which the CV value is restricted to a value equal to or smaller than $\Delta BV - 1$. Consequently, at least one half the exposure amount at the central portion is obtained from flashlight as seen from FIG. 19. This is because it is intended, when the main object is not in a backlighted condition, not to restrict flashlight very much and to obtain an effect of flashlight as much as possible on a photograph.

After the CV value is finally determined in this manner, an aperture value $AV_F$ for the flashlight photographing is calculated at step #S75. As described hereinabove, an exposure control value is calculated in accordance with a peripheral portion brightness $BV_{AM}$, and the relationship $$TV+AV+\Delta SV = BV_{AM}+SV-CV$$

stands between an aperture value AV and a shutter speed DV. Since the shutter speed TV is set, upon flashlight photographing, to the flash synchronization speed $TV_x$, the aperture value $AV_F$ upon flashlight photographing is given by $$AV_F = BV_{AM}+SV-\Delta CV-TV_x.$$

Figure 20A:
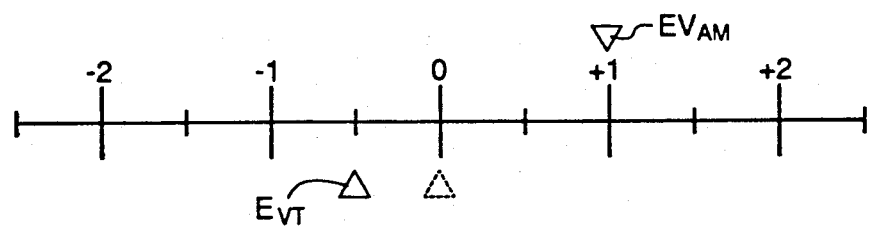
FIGS. 20a, 20b and 20c are diagrammatic representations showing examples of indications of an internal display section employed in the internal flash device.
Figure 20B:
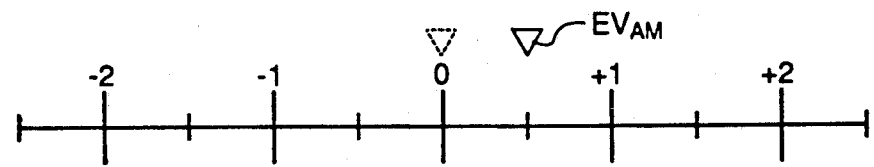

Subsequently at step #S76, an adjusted light amount compensation amount $\Delta EV_F$ described hereinabove is calculated. After then, at step #S77, the CV value and the exposure compensation amount $\Delta SV$ are displayed. Such display is performed on a liquid crystal display panel in the viewfinder or on the top of the camera body using an analog scale of ±2.5 steps as shown in FIGS. 20a and 20b. In each of FIGS. 20a and 20b, a triangle mark $EV_T$ below the scale represents an exposure value $EV_T$ at the central portion, and a value indicated by the triangle mark $EV_T$ represents $\Delta SV$. Meanwhile, another triangle mark $EV_{AM}$ above each scale indicates an exposure value $EV_{AM}$ at the peripheral portion. Then, a distance between the two marks $EV_T$ and $EV_{AM}$ represents a CV value.

For example, FIG. 20a indicates that $\Delta SV = -0.5$ and $CV = +1.5$ while FIG. 20b indicates that $\Delta SV = +1$ and $CV = -0.5$.

Figure 20C:
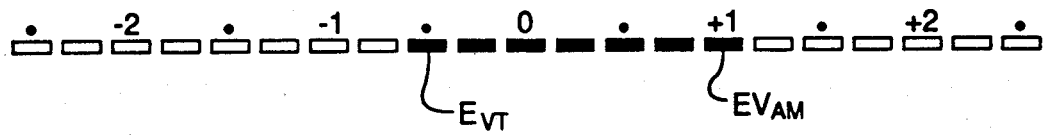

FIG. 20c shows a modification to the display of an exposure compensation value $\Delta SV$ and a CV value and indicates the same values as those in FIG. 20a. In the modification, the display is provided in the form of dots. Each of the dots is constituted, for example, from a light emitting diode panel which can emit light of two colors of red and green. Further, a dot $EV_T$ representing the exposure value $EV_T$ at the central portion is represented in a different color from any other dot, and for example, the dot $EV_T$ is represented in red while any other dot is represented in green. Then, a length of lit dots represents a CV value. It is to be noted that all of the dots may otherwise be represented in the same color while a displaying condition may be varied between the dot $EV_T$ and any other dot, and for example, the dot $EV_T$ may be blinked while any other dot is lit constantly.

Referring back to FIG. 8, after the exposure compensation amount $\Delta SV$ and the CV value are displayed, the light measurement completion flag LMENF is reset at step #S80, whereafter the sequence returns to the original step at which the present subroutine has been called.

Figure 10:
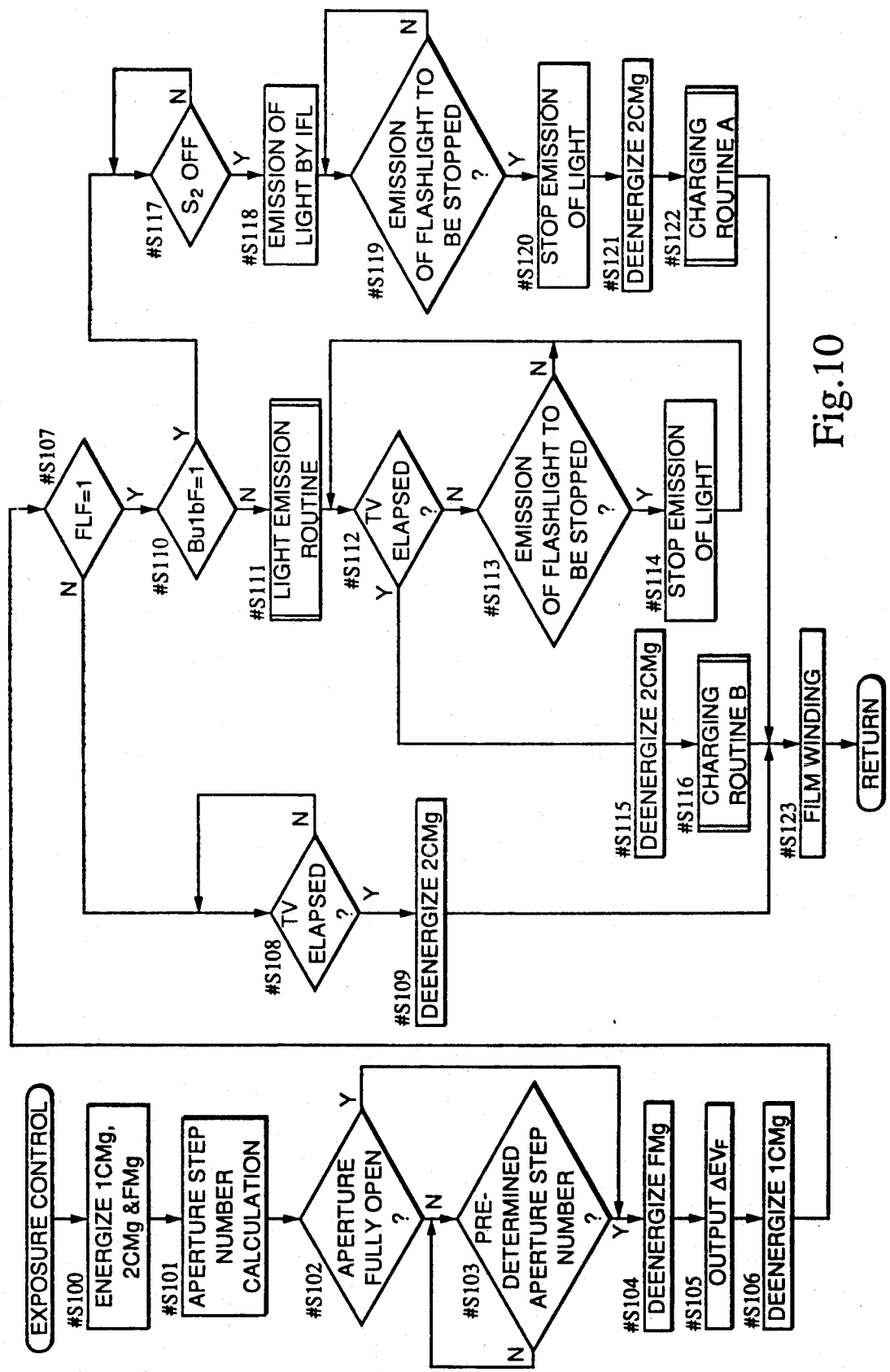

FIG. 10 illustrates the subroutine of the exposure control. When the release button is depressed to the second depth, a mirror not shown of the camera is released from its arrested condition while the switch $S_2$ is turned on, and in response to turning on of the switch $S_2$, the subroutine shown in FIG. 10 is called. After the subroutine is called, the magnets 1CMg, 2CMg and FMg are energized at step #S100. Consequently, even if the mirror is pivoted up and the shutter is released from its arrested condition, the leading shutter blind is prevented from movement. Meanwhile, the diaphragm is released from its arrested condition and starts its stopping down operation. After then, at step #S101, a number of stopping down numbers by which the diaphragm is to be stopped down is calculated from a stopping down value calculated precedently. In case the precedently calculated aperture value is not equal to the open aperture value at step #S102, it is waited at step #S103 until the aperture is stopped down by the number of steps calculated at step #S101, and then at step #S104, the magnet FMg is deenergized to stop the stopping down operation of the aperture. On the other hand, in case the precedently calculated aperture value is equal to the open aperture value at step #S102, the step #S103 is skipped, and the stopping down operation is stopped immediately at step #S104. Subsequently, at step #S105, the flashlight adjusted amount compensation amount $\Delta EV_F$ calculated precedently is outputted to the flashlight adjusted controlling circuit FCC. Then at step #S106, the magnet 1CMg is deenergized to permit the leading shutter blind to start its movement. Subsequently at step #S107, it is judged whether or not the flash flag FLF is equal to 1. If FLF=0 at step #S107, that is, if photographing is to be performed only with ambient light, then it is waited at step #S108 that the exposure time TV calculated precedently elapses, and then at step #S109, the magnet 2CMg is deenergized to permit the trailing shutter blind to start its movement. After the exposure operation is completed (after the movement of the trailing shutter blind is completed), winding of the film and charging of the shutter, mirror and diaphragm are performed at step #S123, whereafter the sequence returns to an original step at which the present subroutine has been called.

Figure 11:
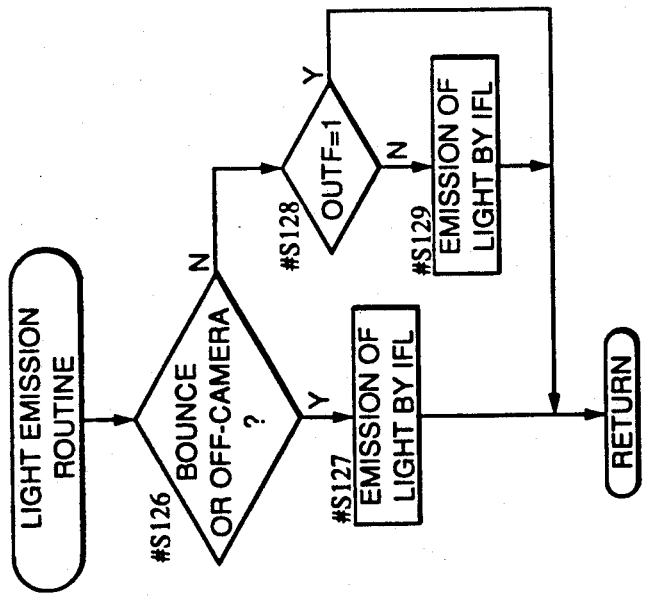

In case the flash flag FLF is equal to 1 at step #S107, it is judged at step #S110 whether or not the bulb flag BulbF is equal to 1. In case BulbF=0, a light emission routine is executed at step #S111. In the light emission subroutine which is illustrated in FIG. 11, it is first judged at step #S126 whether or not bounce photographing or flashlight photographing in an off-camera condition should be performed. In case either bounce photographing should be performed or flashlight photographing should be performed in an off-camera condition, the internal flash device IFL is caused to emit flashlight at step #S127, whereafter the sequence returns to an original step at which the present subroutine has been called, and in this instance, to step #S111 of FIG. 10. On the other hand, if neither bounce photographing nor off-camera photographing should be performed at step #126, then it is judged at step #S128 whether or not the external flash priority flag OUTF is equal to 1. Then, if OUTF=0, then the internal flash device IFL is caused to emit light at step #S129, whereafter the sequence returns to the original step. In case OUTF=1 at step #S128, the sequence immediately returns to the original step.

Referring back to FIG. 10, after execution of the light emission routine at step #S111, it is judged at step #S112 whether or not the precedently calculated exposure time TV has elapsed. If the exposure time TV has not yet elapsed, then the sequence advances to step #S113 at which it is judged whether or not a light emission stopping signal FSTOP has been received from the flashlight adjusting controlling circuit FCC. Then, if such signal FSTOP has been received, then emission of flashlight of the internal flash device IFL is stopped at step #S114, whereafter the sequence returns to step #S112. It is to be noted that the signal FSTOP is delivered also to the external flash device OFL, and upon reception of the signal FSTOP, also the external flash device OFL stops its emission of flashlight. In case no such signal FSTOP has been received at step #S113, the sequence returns to step #S112. Such a sequence of operations is repeated until the exposure time TV elapses.

If it is judged at step #S112 that the exposure time TV has elapsed, then the sequence advances to step #S115 at which the magnet 2CMg is deenergized to permit the trailing shutter blind to start its movement. After then, the charging routine B (refer to FIG. 7) is executed at step #S116, and then, after the movement of the trailing shutter blind is completed, winding of the film and charging of the shutter, mirror and diaphragm are executed at step #S123, whereafter the sequence returns to the original step at which the present subroutine has been called.

In case BulbF=1 at step #S110, this means that the current flash mode is the trailing shutter blind synchronization mode, and accordingly, it is waited at step #S117 that the release switch $S_2$ is turned off. After the release switch $S_2$ is turned off, the internal flash device IFL is caused to emit flashlight at step #S118. Then, it is waited at step #S119 that a light emission stopping signal FSTOP is received from the flashlight adjusting controlling circuit FCC, and then at step #S120, emission of flashlight of the internal flash device IFL is stopped, whereafter the sequence advances to step #S121. At step #S121, the magnet 2CMg is deenergized to permit the trailing shutter blind to start its movement. Then at step #S122, the charging routine A (refer to FIG. 6) described hereinabove is executed. Thus, the either after changing of the capacitor C2 of the internal flash device IFL is completed or after the charged voltage of the capacitor C2 becomes equal to or higher than the operation starting voltage $V_2$, the sequence advances to step #S123 at which, after completion of the movement of the trailing shutter blind, a film winding operation and charging operations of the shutter, mirror and diaphragm are started, whereafter the sequence returns to the original step.

Figure 12:
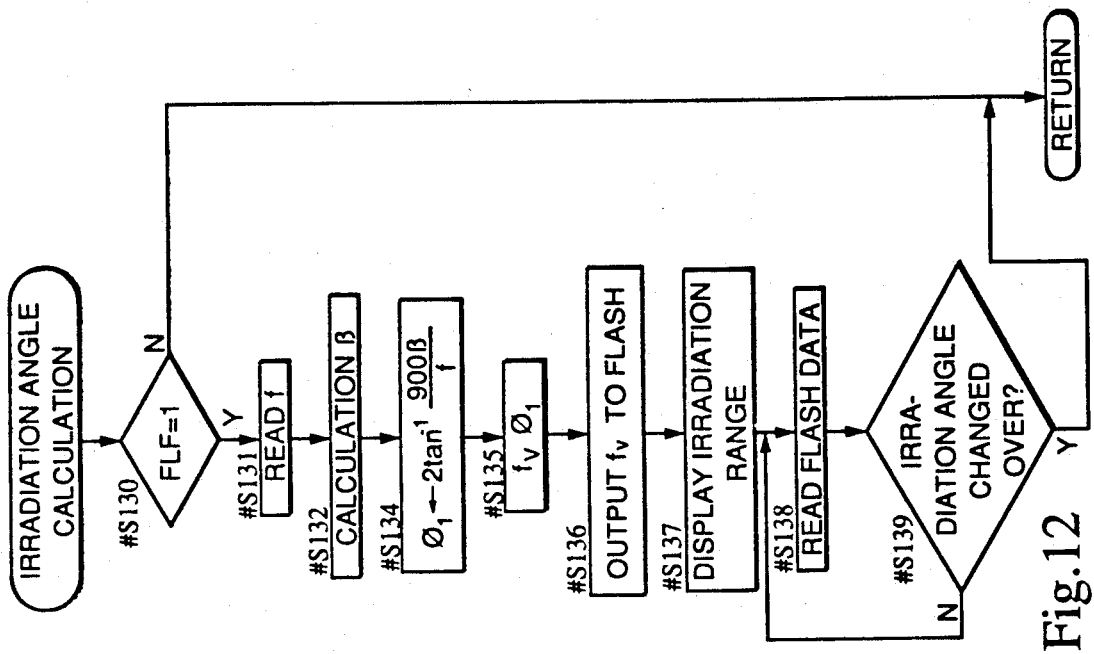

FIG. 12 illustrates the irradiation angle calculating routine. After the subroutine is called, it is first judged at step #S130 whether or not the flash flag FLF is equal to 1, and if FLF=0, then the sequence immediately returns to an original step at which the present subroutine has been called. But in case FLF=1, data of a focal length f is received from the lens circuit LEC at step #S131, and then a photographing magnification $\beta$ is calculated at step #S132.

Figure 21:
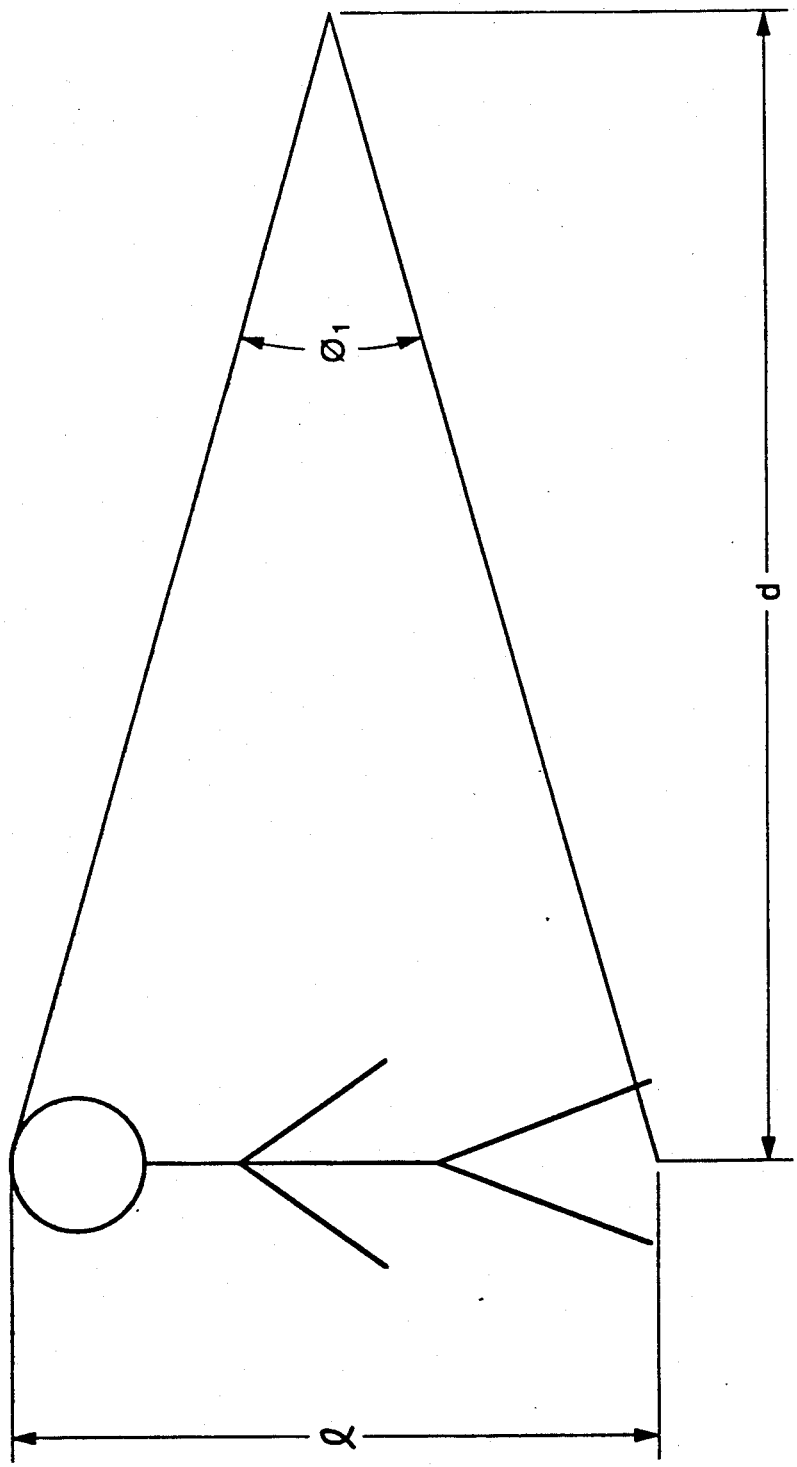
FIG. 21 is a schematic view illustrating a range of flashlight projected toward an object.

Subsequently, a flashlight irradiation angle $\theta_1$ is calculated at step #S134. Here, such flashlight irradiation angle will be described with reference to FIG. 21. A size (height or width) of an object to be photographed is represented by l, a photographing distance by d, and a flashlight irradiation angle by $\theta_1$. In this instance, if the irradiation angle $\theta_1$ is set such that flashlight may be projected only to the object, then $$\tan(\theta_1/2) = l/2d$$

as apparently seen from FIG. 21. Meanwhile, where a photographing magnification is represented by $\beta$ and a focal length of the lens by f, because $\beta = f/d$, $$\theta_1 = 2\tan^{-1}(l \cdot \beta/2f).$$

In the present embodiment, a photograph of the whole body of a person who is 180 cm tall is adopted as a reference, and accordingly, l=1,800 (mm). Consequently, $$\theta_1 = 2\tan^{-1}(900\beta/f).$$

Referring back to FIG. 12, after such calculation of the irradiation angle $\theta_1$, the sequence advances to step #S135 at which focal length data fv having a same angle of view as the flashlight irradiation angle $\theta_1$ calculated at step #S134 is found out in accordance with Table 1 below.

TABLE 1

| $\theta_1$ [°] | | 78~70~ | 60~46~ | 36~31~ | 27~24~ | | |
|---|---|---|---|---|---|---|---|
| fv [mm] | 24 | 28 | 35 | 50 | 70 | 85 | 105 | 135 |

If, for example, $\theta_1 = 65°$, then fv=28 [mm].

Subsequently, at step #S136, data of the focal length fv is transmitted to the external flash device OFL. In the external flash device OFL, the irradiation angle changing over motor M3 is energized in accordance with the data of the focal length fv. It is to be noted that, at step #S136, also contents of the flash flag FLF and the external flash priority flag OUTF are outputted to the external flash device OFL in order to inhibit or permit emission of flashlight of the external flash device OFL. While the irradiation angle is being changed over in the external flash device OFL, the flashlight irradiation range is indicated, at step #S137, on a viewfinder screen (which will be hereinafter described) on the camera body side. Then at step #S138, flash data are taken in from the external flash device OFL, and then at step #S139, it is judged whether or not the irradiation angle changing over operation has been completed. If the irradiation angle changing over operation has been completed already at step #S139, then the sequence returns to an original step at which the present subroutine has been called. On the contrary, if the irradiation angle changing over operation has not yet been completed at step #S139, then the sequence returns to step #S138 in order to wait completion of the irradiation angle changing over operation.

Figure 22:
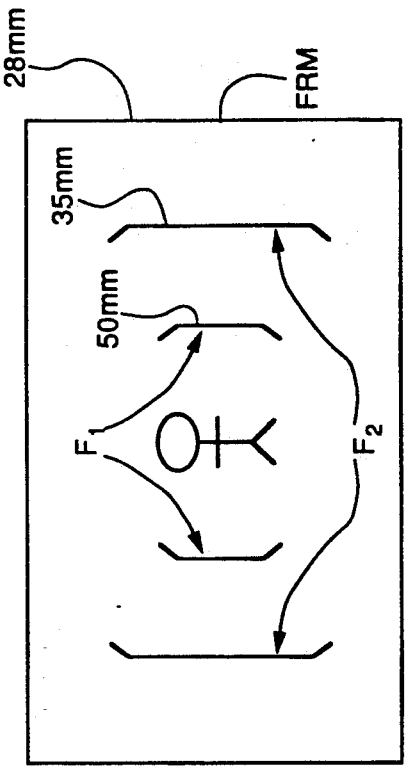
FIG. 22 is a diagrammatic representation showing an example of indication of a flashlight irradiating range in the internal display section.

Here, an indication of a flashlight irradiation range at step #S137 will be described with reference to FIG. 22. A case is examined as an example wherein a lens having a focal length 28 mm is employed. If a focal length having a same angle of view as the flashlight emission angle $\theta_1$ calculated at step #S134 is 50 mm, then a frame F1 is indicated in a photographing screen FRM, but if the focal length fv is 35 mm, then another frame F2 is indicated in the photographing frame FRM. Where a flashlight irradiation range is indicated in the photographing frame FRM in this manner, a photographer can readily identify a range to which flashlight is to be projected.

By the way, as the irradiation range of flashlight decreases, the amount of flashlight to be projected to a unit area increases and the guide number GNo. of flashlight increases. Table 2 below indicates an exemplary relationship between the focal length fv of a lens and the guide number GNo.

TABLE 2

| Focal Length fv | 28 mm | 35 mm | 50 mm | 70 mm | 85 mm |
|---|---|---|---|---|---|
| GNo. | 22 | 25 | 28 | 30 | 32 |

For example, if it is assumed that, when photographing is to be performed using a photographing lens having a focal length 28 mm, the flashlight irradiation angle $\theta_1$ necessary for flashlight to irradiate the whole body of a main object to be photographed is equal to an angle of view of a lens having a focal length 85 mm, then the changing ratio in guide number GNo. after changing over of the irradiation angle is 32/22=1.45 as obtained from Table 2 above. Accordingly, the guide number GNo. in this instance is equal to about 1.5 times that in the case when flashlight is projected to an entire photographing screen, and accordingly, also the distance within which flashlight can reach can be increased to about 1.5 times.

Figure 13:
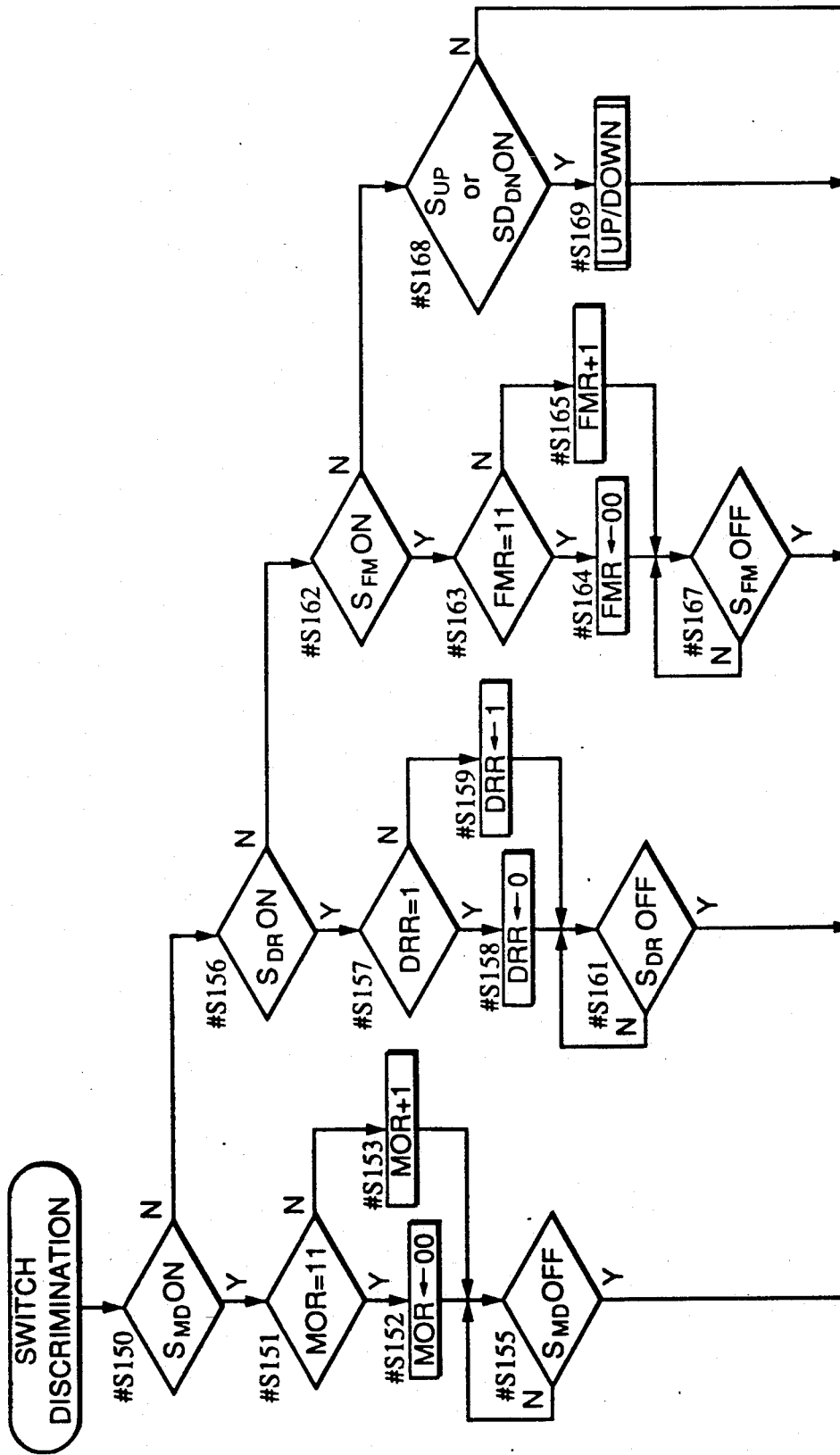

FIG. 13 illustrates the switch discrimination routine which is executed at step #7 of FIG. 3. Referring to FIG. 13, after the subroutine is called, it is first called at step #S150 whether or not the exposure controlling mode changing over switch $S_{MD}$ is in an on-state, and if the switch $S_{MD}$ is on, then it is judged at step #S151 whether or not an exposure control mode register MOR is equal to "11" (binary value). If MOR="11" then the exposure control mode register MOR is set to "00" at step #S152, but on the contrary if MOR≠"11", then MOR is incremented by one, that is, MOR=MOR+1, whereafter the sequence advances to step #S155. Here, the exposure control mode register MOR is a 2-bit register for selecting one of the four exposure control modes described hereinabove. In particular, when MOR="00", the programmed AE (automatic exposure) mode (P mode) is selected: when MOR="01", the aperture priority AE mode (A mode) is selected; when MOR="10", the shutter speed priority AE mode (S mode) is selected; and when MOR="11", the manual mode (M mode) is selected. After then, it is waited at step #S155 that the switch $S_{MD}$ is turned off, whereafter sequence returns to an original step at which the present subroutine has been called.

In case the switch $SM_D$ is not on at step #S150, it is judged at step #S156 whether or not the drive mode changing over switch $SD_R$ is in an on-state. If the switch $SD_R$ is on, then it is judged at step #S157 whether or not a drive mode register DRR is equal to 1, and in case DRR=1, then DRR is reset to DRR=0 at step #S158, but on the contrary if DRR≠1, then DRR is set to DRR=1 at step #S159. Here, DRR is a single-bit register for selecting a drive mode, and when DRR=0, the single photographing mode (one frame photographing) is selected, but when DRR=1, the successive photographing mode (continuous photographing) is selected. After then, it is waited at step #S161 that the drive move switch $S_{DR}$ is turned off, whereafter the sequence returns to the orginial step.

If the switch $S_{DR}$ is not in an on-state at step #S156, then it is judged at step #S169 whether or not the flash mode changing over switch $S_{FM}$ is in an on-state. If the switch $S_{FM}$ is on, then the sequence advances to step #S163 at which it is judged whether or not a register FMR is equal to "11" (binary value). Then, if FRM="11", then FRM is reset to FRM="00" at step #S164, but if FRM≠"11", then FMR is incremented by one, that is, FMR=FMR+1, at step #S165, whereafter the sequence advances to step #S167. Here, the register FMR is a register for selecting one of the four flash modes described hereinabove. In particular, when FMR="00", the compulsory light emission mode is selected; when FMR="11", the automatic light emission mode is selected; when FMR="10", the trailing shutter blind synchronization mode is selected; and when FMR="11", the no light emission mode is selected. After then, it is waited at step #S167 that the switch $S_{FM}$ is turned off, whereafter the sequence returns to the original step.

In case the switch $S_{FM}$ is not on at step #S162, the sequence advances to step #S168 at which it is judged whether or not either one of the up and down switches $S_{UP}$ and $S_{DN}$ is in an on-state. If neither the up switch $S_{UP}$ or the down switch $S_{DN}$ is on, then the sequence immediately returns to the original step, but otherwise if either one of them is on, then the up/down subroutine is executed at step #S169.

In the up/down subroutine which is illustrated in FIG. 14, it is first judged at step #S180 whether or not the light measurement completion flag LMENF is equal to 1. If LMENF=1, then since the photographing preparation switch $S_1$ is in an on-state, the up or down switch $S_{UP}$ or $S_{DN}$ is used for the setting of a contrast CV, and accordingly, the sequence advances to step #S192 at which the CV determination subroutine described hereinabove is executed, whereafter the sequence returns to an original step at which the present subroutine has been called, that is, to step #S169 shown in FIG. 13 in this instance. On the other hand, if LMENF=0 at step #S180, then since the switch $S_1$ is in an off-state, the up or down switch $S_{UP}$ or $S_{DN}$ is used for setting of an aperture value AV or a shutter speed TV, and then the sequence advances to step #S181. At #S181, lens data (a maximum aperture value and an open aperture value) are received from the lens circuit LEC in order to find out a range over which the aperture can be controlled. Then at step #S182, it is judged whether or not the current exposure control mode is the manual mode (M mode). In the case of the M mode, it is judged at step #S183 whether or not the aperture setting switch $S_{AV}$ is in an on-state, and if it is on, then the aperture value AV is incremented or decremented by a predetermined value (for example, 0.5 EV) at step #S184. After then, the aperture value AV is restricted at #S185 in accordance with the lens data (the maximum aperture value and the open aperture value) received at step #S181, whereafter the sequence advances to step #S191. On the other hand, if the aperture setting switch $S_{AV}$ is not in an on-state at step #S183, then the shutter speed TV is incremented or decremented by a predetermined value (for example, 1 EV) at step #S186, and then the shutter speed TV is restricted (for example, 5≦TV≦12) at step #S187, whereafter the sequence advances to step #S191. If the current exposure control mode is not the M mode at step #S182, then it is judged at step #188 whether or not the current exposure control mode is the A mode (aperture priority AE mode), and if the current exposure control mode is the A mode, then the sequence advances to step #S184 at which setting of an aperture value AV is executed. In case the current exposure control mode is not the A mode, then it is judged at step #S189 whether or not the current exposure control mode is the S mode (shutter speed priority AE mode), and if the current exposure control mode is the S mode, then the sequence advances to step #S186 at which setting of a shutter speed TV is executed. If the current exposure control mode is not the S mode, then this means that the current exposure control mode is the P mode (programmed AE mode), and accordingly, the sequence advances directly to step #S191 without executing setting of any of an aperture value AV and a shutter speed TV.

It is to be noted that, when the current exposure control mode is the P mode, if the switch $S_{UP}$ or $S_{DN}$ is in an on-state, then the shutter speed TV may otherwise be incremented or decremented by a predetermined value (for example, 0.5 EV) while the aperture value AV is incremented or decremented by the same value. With the modification, so-called program shifting can be made by operating the switch $S_{UP}$ or $S_{DN}$.

Subsequently, operation of the in-flash microcomputer CPUF of the external flash device OFL will be described. When the flash main switch FMS of the external flash device OFL is changed over from an off-state to an on-state, an interrupt pulse is generated by the pulse generator PG as described hereinabove and is delivered to the interrupt terminal $INT_F$ of the in-flash microcomputer CPUF. In response to such interrupt pulse received, the in-flash microcomputer CPUF executes the interrupt processing INT1 illustrated in FIG. 15. In the interrupt processing, interrupt is first enabled at step #F1, and then, it is judged at step #F2 whether or not the flash main switch FMS is in an on-state. If the flash main switch FMS is on, then it is judged at step #F3 whether or not charging of the main capacitor MC has been completed, and if charging has not been completed yet, then charging is started at step #F4, but on the contrary if charging has been completed, then the charging operation is stopped at step #F5, whereafter the sequence returns to step #F1. In case the flash main switch FMS is in an off-state at step #F2, then charging is stopped at step #F6, and a standby condition is entered at step #F7 in which the in-flash microcomputer CPUF waits for subsequent next interrupt.

Figure 16:
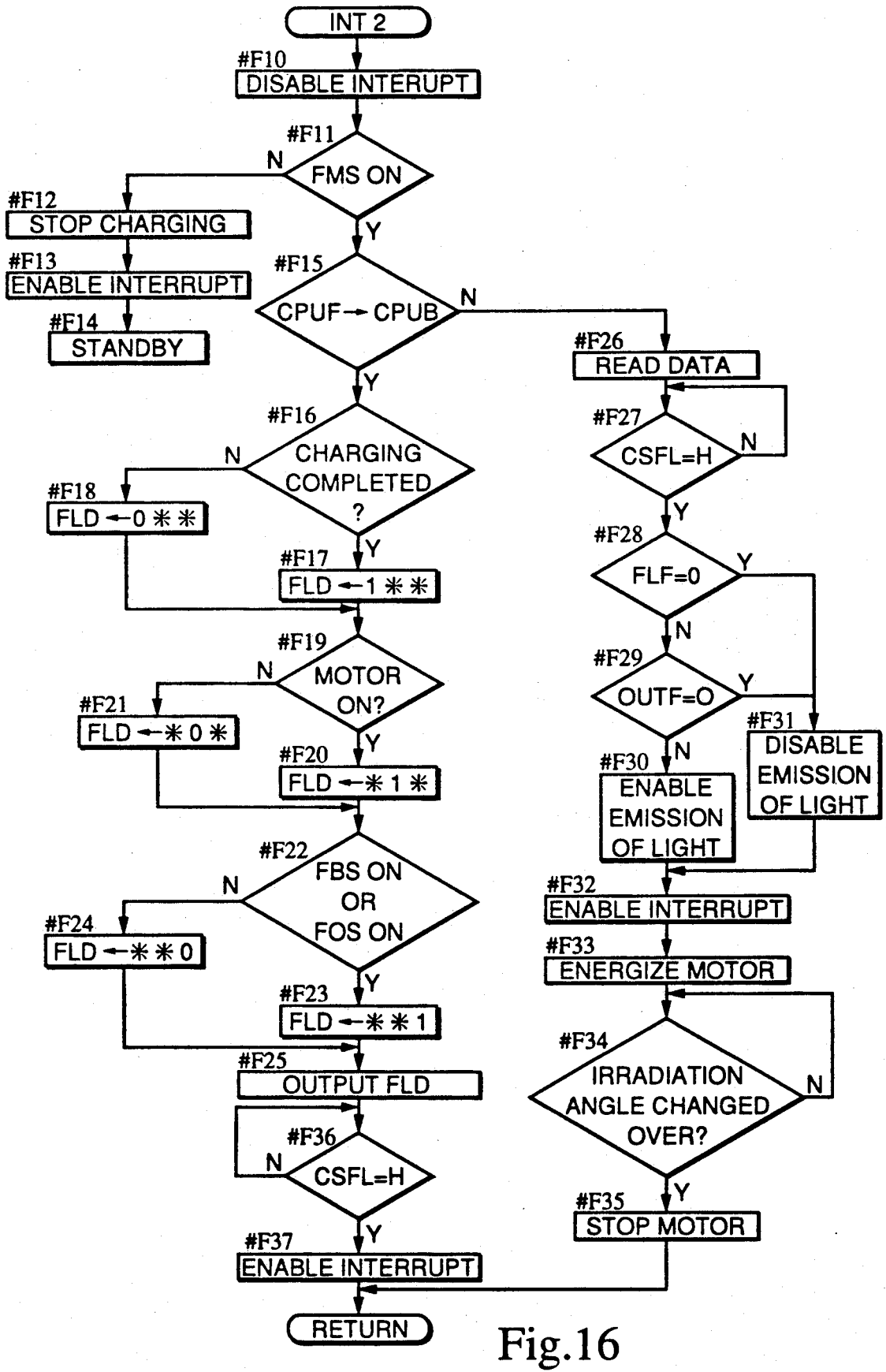

On the other hand, when a flash selection signal CSFL from the camera body side is changed to a "Low" level, the in-flash microcomputer CPUF executes the interrupt processing INT2 illustrated in FIG. 16. In the interrupt processing INT2, interrupt is first disabled at step #F10, and then at step #F11, it is judged whether or not the flash main switch FMS is in an on-state. If the flash main switch FMS is off, then charging of the main capacitor MC is stopped at step #F12, and then, interrupt is enabled at step #F13, whereafter the in-flash microcomputer CPUF enters a standby condition. If the flash main switch FMS is on at step #F11, then it is judged at step #F15 whether a signal is to be transmitted from the external flash device OFL to the camera body or reversely from the camera body to the external flash device OFL. If a signal is to be transmitted from the external flash device OFL to the camera body, then it is judged at step #F16 whether or not charging of the main capacitor MC has been completed. If charging has been completed, then the third bit $b_2$ of flash data FLD is changed to 1 at step #F17, but on the contrary if charging has not been completed yet, then the third bit $b_2$ of the flash data FLD is changed to 0 at step #F18, whereafter the sequence advances to step #F19. Here, the flash data FLD is status data composed of three bits $b_2$, $b_1$ and $b_0$. At step #F19, it is judged whether or not the irradiation angle changing over motor $M_3$ is operating. If the motor $M_3$ is operating, then the second bit $b_1$ of the flash data FLD is changed to 1 at step #F20, but if the motor $M_3$ is not operating, the second bit $b_1$ of the flash data FLD is changed to 0 at step #F21, whereafter the sequence advances to step #F22. At step #F22, it is judged whether or not the bounce switch FBS is in an on-state or the off-camera switch FOS is in an on-state. If the bounce switch FBS is on or the off-camera switch FOS is on, then the first bit $b_0$ of the flash data FLD is changed to 1 at step #F23, but if the bounce switch FBS is off and the off-camera switch FOS is off, then the first bit $b_0$ of the flash data FLD is changed to 0 at step #F24, whereafter the sequence advances to step #F25. The flash data FLD obtained in this manner are outputted to the camera body side at step #F25, and then it is waited at step #F36 that the flash select signal CSFL changes to a "High" level. After the signal CSFL changes to a "High" level, interrupt is enabled at step #F37, whereafter the sequence returns to an initial step.

On the other hand, if transmission of a signal from the camera body side to the external flash device OFL is judged at step #F15, then data from the camera body are received at step #F26. Such data may include data of a focal length fv for changing over an irradiation angle, a flash flag FLF and an external flash priority flag OUTF. At step #F27, the in-flash microcomputer CPUF waits until the flash select signal CSFL changes to a "High" level. After the flash select signal changes to a "High" level, the flash flag FLF is checked at step #F28. If FLF=0, then this means that flashlight should not be performed, and accordingly, emission of flashlight is inhibited at step #F31, whereafter the sequence advances to step #F32.

If FLF=1 at step #F28, then the flag OUTF is checked at step #F29. In case OUTF=0, this means that the external flash device OFL should not emit light, and the sequence advances to step #F31. On the contrary, if OUTF=1, then the external flash device OFL should emit light, and consequently, emission of flashlight is enable at step #F30, whereafter the sequence advances to step #F32.

At step #F32, interrupt after then is enabled, and then the sequence advances to step #F33. At step #F33, the irradiation angle changing over motor $M_3$ is energized. Then at step #F34, a signal from the code plate ZPC for the detection of an irradiation angle is received, and the motor $M_3$ is kept energized until the irradiation angle corresponds to the focal length fv. After completion of changing over of the irradiation angle, the motor $M_3$ is stopped at step #F35, whereafter the sequence returns to the initial step.

Finally, the flags and registers used in the embodiment described above are listed in Table 3 and Table 4 below, respectively.

TABLE 3

| Name of Flag | Contents of Flag (Upper Line: 1, Lower Line: 0) |
|---|---|
| BulbF | Bulb Photographing (Trailing Shutter Blind Synchronization Mode) |
|  | Others |
| CONTF | Second or Following Frame in Successive Photographing |
|  | Others |
| FLF | Flashlight Photographing |
|  | Ambient Light Photographing |
| FLOKF | External Flash Enabled |
|  | External Flash Disabled |
| LMENF | Light Measurement Calculation Completed |
|  | Light Measurement Calculation Not Completed |
| OUTF | External Flash to Emit Light |
|  | External Flash not to Emit Light |
| READYF | Charging Completed |
|  | Charging Not Completed |
| RLF | Backlighted |
|  | Regularly Lighted |

TABLE 4

| Name of Register | Contents |
|---|---|
| DRR | 0: Single Photographing Mode |
|  | 1: Successive Photographing Mode |
| FMR | 00: Compulsory Light Emission Mode |
|  | 01: Automatic Light Emission Mode |
|  | 10: Trailing Shutter Blind Synchronization Mode |
|  | 11: No Light Emission Mode |
| MOR | 00: P Mode |
|  | 01: A Mode |
|  | 10: S Mode |
|  | 11: M Mode |
| FLD b2 | 1: Charging Completed |
|  | 0: Charging Not Completed |
| b1 | 1 ... Irradiation Angle Being Changed Over |
| b0 | 1 ... Bounce Photographing or Off-Camera Flashlight Photographing |

In the embodiment described hereinabove, the internal flash device IFL emits flashlight when the current flash mode is the trailing shutter blind synchronization mode. However, the external flash device OFL may otherwise be used in the trailing shutter blind synchronization mode. To this end, the embodiment may be modified in the following manner.

As for modification to the hardware construction, first the synchronization switch SX is omitted. Then, an exclusive signal line for a light emission starting signal SXON from the microcomputer CPUB is provided and connected to the terminal $P_{F3}$ of the microcomputer CPUF in the external flash device OFL by way of the connecting terminal TM1.

Figure 24:
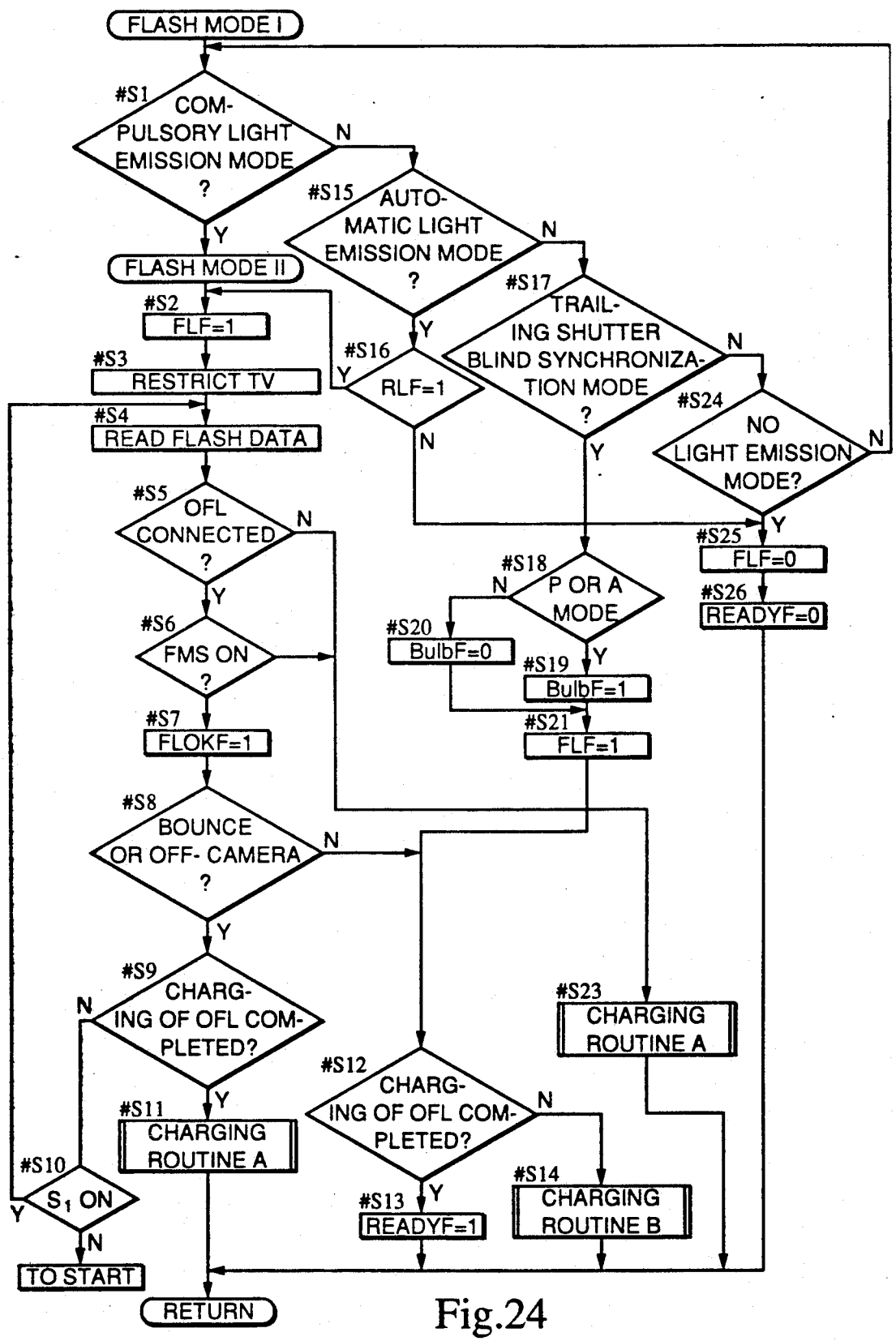
FIGS. 24 to 26 are flow charts illustrating modified operation of the camera system show in FIG. 1.
Figure 25:
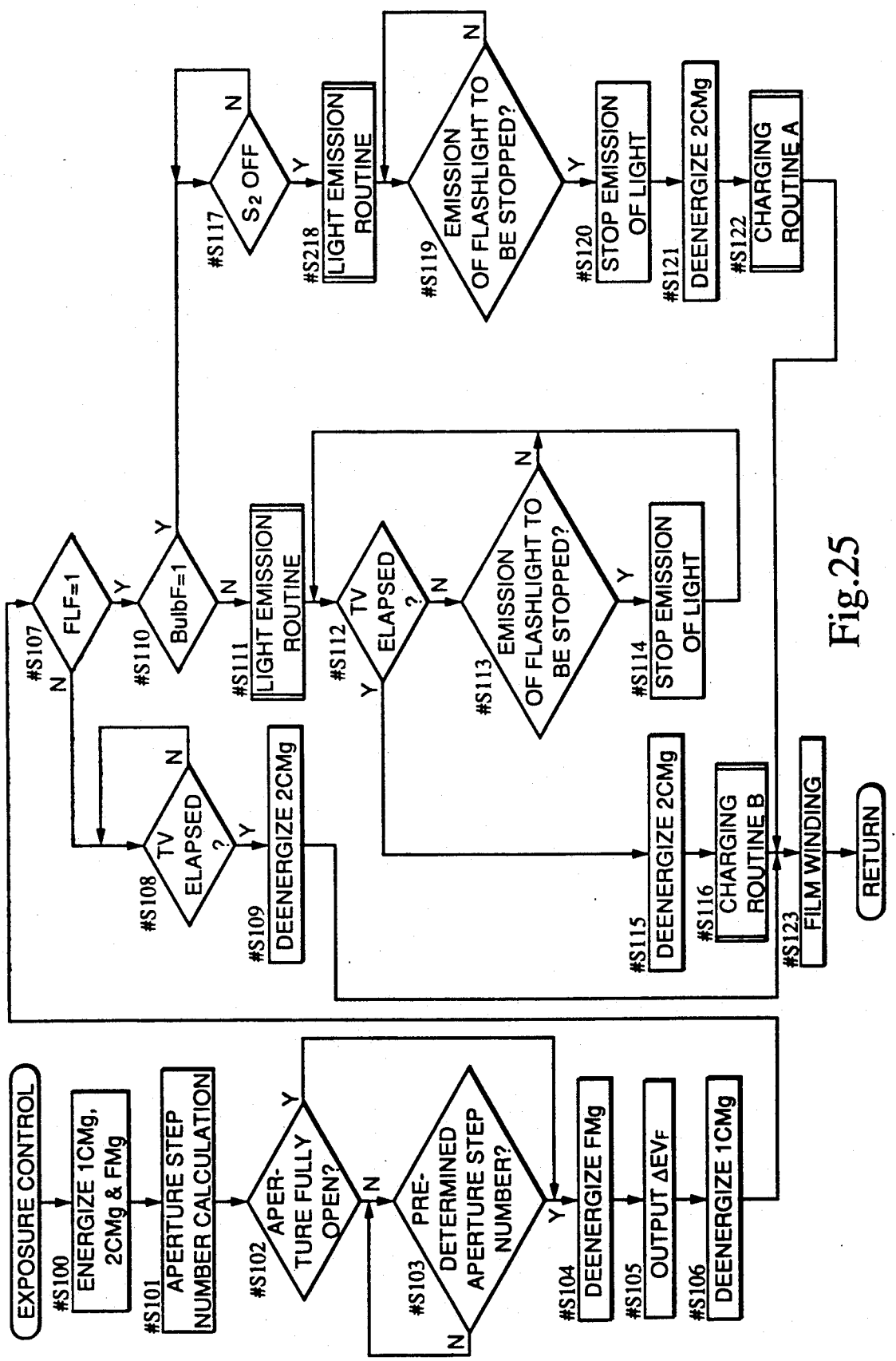
Figure 26:
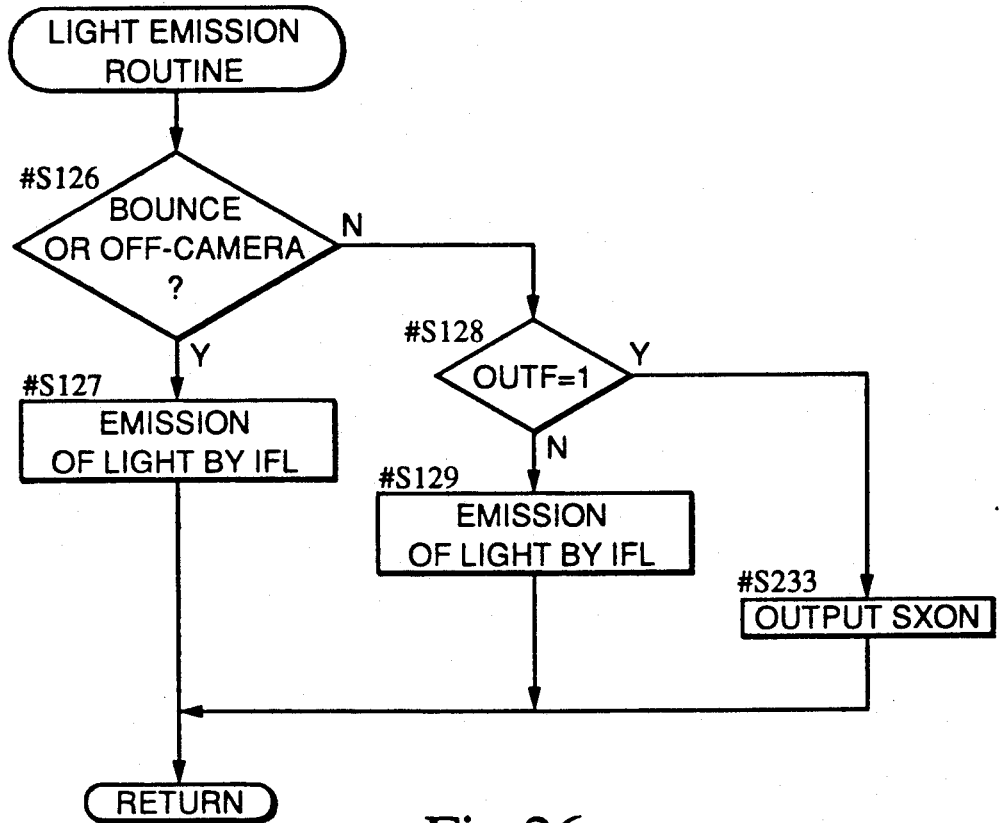

As for modification to the software construction, the routines of the flash mode I, exposure control and light emission shown in FIGS. 5, 10 and 11 are modified in such a manner as shown in FIGS. 24, 25 and 26, respectively. In particular, the routine of the flash mode I shown in FIG. 5 is first modified such that the step #S22 (OUTF=0) in the flow chart of FIG. 5 is omitted and the sequence advances from step #S21 to step #S12 as shown in FIG. 24. Then, the exposure control routine shown in FIG. 10 is modified such that the step #S118 is replaced by another step #218 at which the modified light emission routine shown in FIG. 26 is called as shown in FIG. 25. Then, the modified light emission routine of FIG. 26 includes an additional step #S233 to the light emission routine shown in FIG. 11 such that, if OUTF=1 at step #S128, then a light emission starting signal SXON is delivered to the external flash device OFL at step #S233.

Or else, only the software construction may be modified in the following manner.

Figure 27:
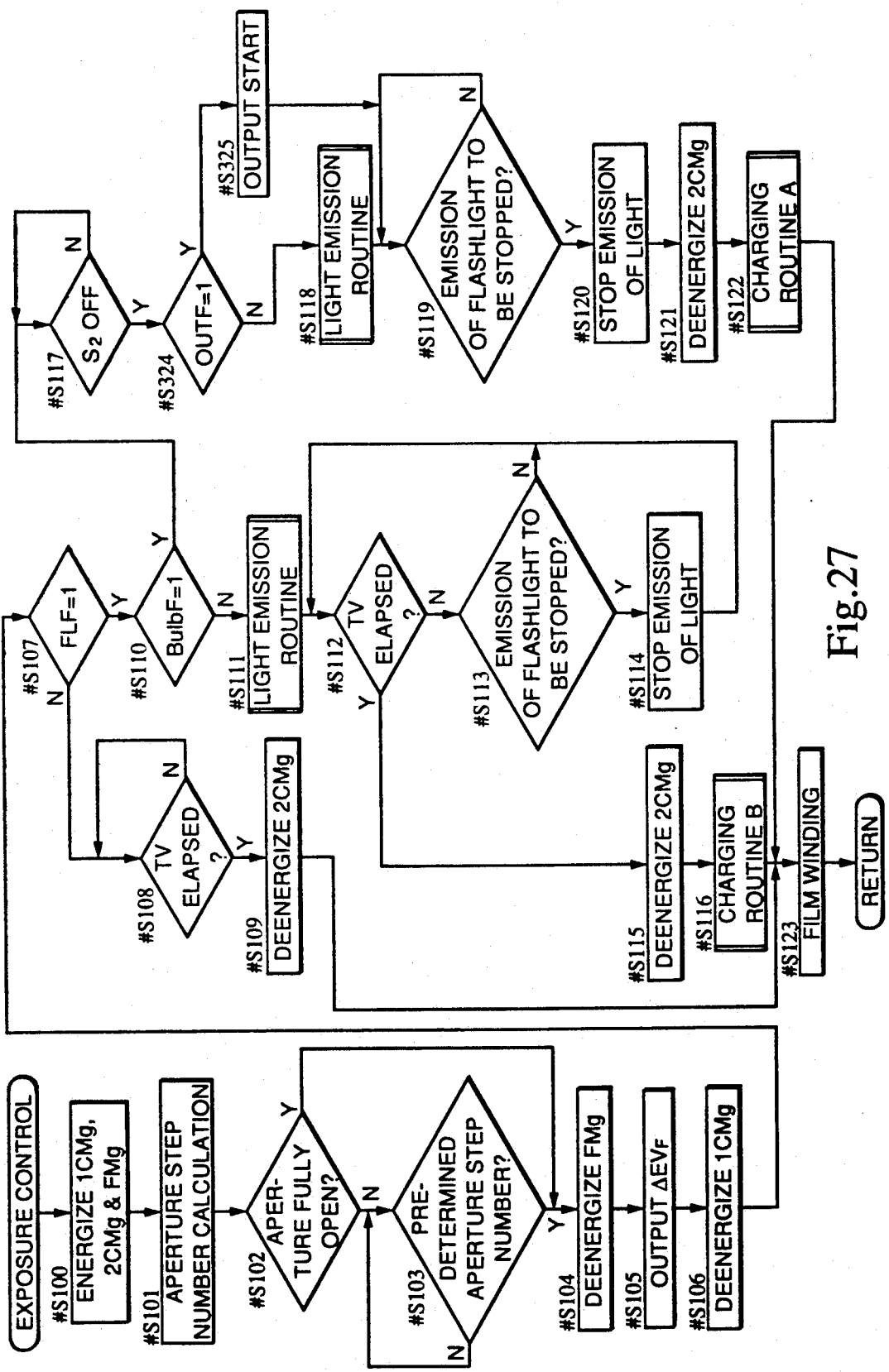
FIGS. 27 and 28 are flow charts illustrating another modified operation of the camera system shown in FIG. 1.
Figure 28:
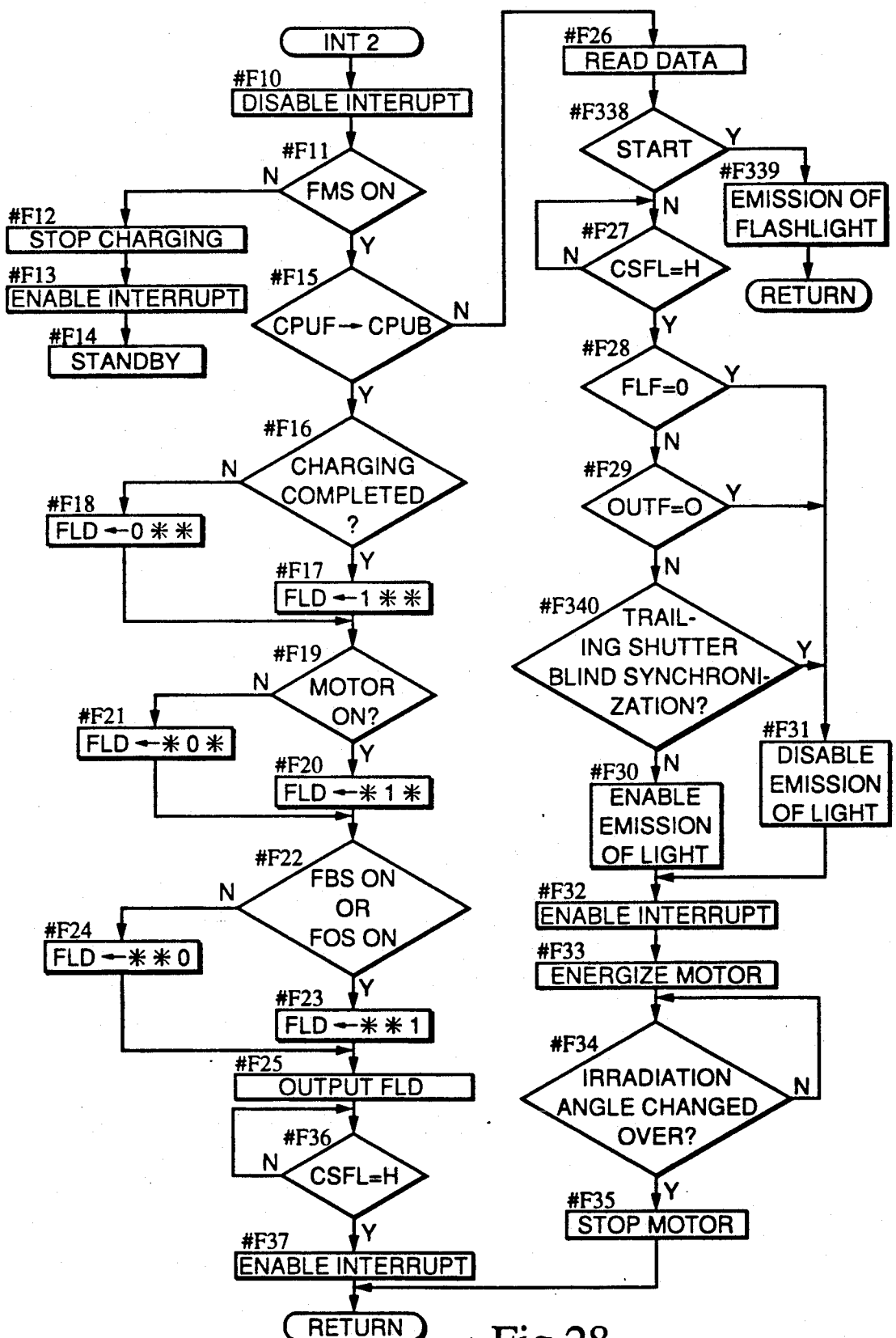

In particular, first a current flashlight emission mode is outputted also as flash data to the external flash device OFL at step #S136 in the irradiation angle calculation routine shown in FIG. 12 though not particularly shown in the figure. Then, the exposure control routine shown in FIG. 10 is modified in such a manner as seen in FIG. 27 wherein an additional step #S324 is interposed between the steps #S117 and #S118 of the subroutine of FIG. 10. In particular, the flag OUTF is checked at step #S324, and if OUTF≠1, then the sequence advances to step #S118, but on the contrary if OUTF=1, then a light emission starting signal START (different from SXON) is outputted at another additional step #S325 to the external flash device OFL by way of the interface circuit INF similarly as any other flash data, whereafter the sequence advances to step #S119 bypassing the step #S118. Further, the interrupt routine INT2 shown in FIG. 16, which is executed by the in-flash microcomputer CPUF, is also modified in such a manner as seen in FIG. 28. In particular, referring to FIG. 28, and additional step #F338 is interposed between the step #F26 and #F27 for judging whether or not a light emission starting signal START has been received. Then, if such light emission starting signal START has been received at step #F338, a signal is transmitted to the flashlight adjusting controlling circuit CC at another additional step #F339 so that flashlight may be emitted compulsorily irrespective of whether or not emission of flashlight is enabled, whereafter the sequence returns to the initial step. But in case no light emission starting signal START has been received at step #F338, the sequence advances to step #F27. In addition, a further additional step #F340 is interposed between the steps #F29 and #F30 for judging whether or not the current light emission mode is the trailing shutter blind synchronization mode, and in the case of the trailing shutter blind synchronization mode, the sequence advances to step #F31 in order to thereafter inhibit emission of flashlight, or otherwise, the sequence advances to step #F30.

Figure 23:
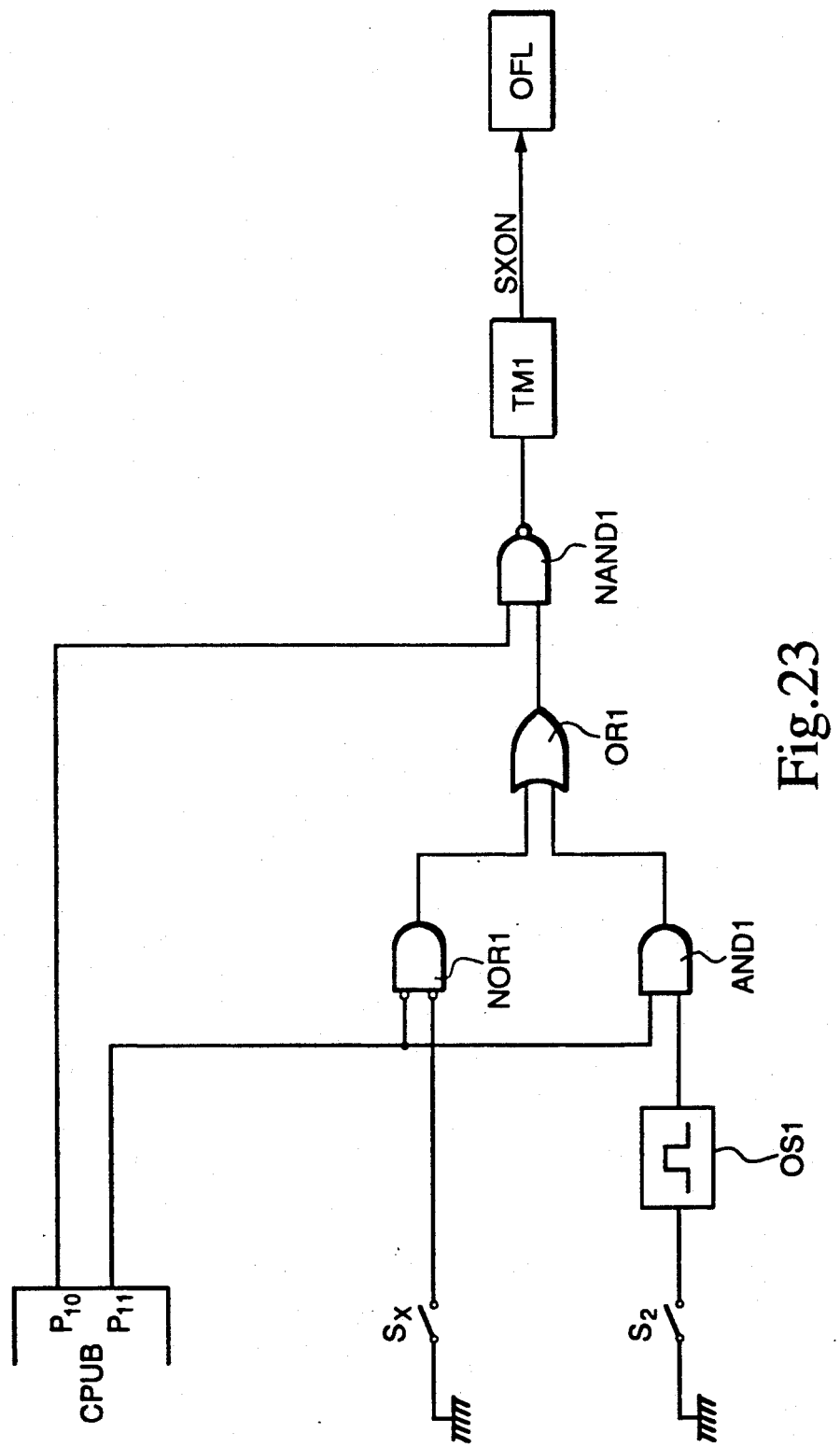
FIG. 23 is a circuit diagram of a modification to part of the camera system shown in FIG. 1.

On the other hand, the hardware construction may be modified in such a manner as seen in FIG. 23.

Referring to FIG. 23, when the flag OUTF is in a set-state, a "High" level is outputted from an additional terminal $P_{10}$ of the in-body microcomputer CPUB to a NAND circuit NAND1, and when the current light emission mode is the trailing shutter blind synchronization mode, a "High" level is outputted from a further additional terminal $P_{11}$ of the microcomputer CPUB to a NOR circuit NOR1 (represented in negative logic) and an AND circuit AND1. The synchronization switch SX is connected to the NOR circuit NOR1. The release switch $S_2$ is connected to the AND circuit AND1 by way of a one-shot circuit OS1. The one-shot circuit OS1 delivers a one-shot pulse of a "High" level of a predetermined duration when the switch $S_2$ is changed to an off-state. Outputs of the NOR circuit NOR1 and the AND circuit AND1 are both coupled to an OR circuit OR1 which has an output connected to the NAND circuit NAND1. An output of the NAND circuit NAND1 is coupled as a light emission starting signal SXON to the external flash device OFL by way of the terminal TM1.

Upon ordinary photographing using the external flash device OFL, a "High" level is outputted from the terminal P10 while a "Low" level is outputted from the terminal P11. Accordingly, if movement of the leading shutter blind is completed and the switch SX is turned on, then the output of the NAND circuit NAND1 is changed to a "Low" level. Consequently, a signal SXON is inputted to the external flash device OFL to cause the external flash device OFL to emit flashlight. It is to be noted that, since a "Low" level is outputted from the terminal $P_{11}$, even if photographing is completed and the switch $S_2$ is turned off so that a pulse of a "High" level is delivered from the one-shot circuit OS1, the AND circuit AND1 continues to output a "Low" level. Accordingly, no signal SXON is outputted again.

In the trailing shutter blind synchronization mode in which the external flash device OFL is used, a "High" signal is outputted from both of the terminals $P_{10}$ and $P_{11}$. Accordingly, even if the synchronization switch SX is turned on, the NOR circuit NOR1 does not output a "High" level, and hence no light emission starting signal is outputted. After photographing is completed and the switch $S_2$ is turned off, a one-shot pulse of a "High" level is delivered from the one-shot circuit OS1. Since a "High" level is outputted from the terminal $P_{11}$, a "High" level is outputted from the AND circuit AND1 and also from the OR circuit OR1. Since a "High" level is outputted from the terminal $P_{10}$, when the outputted of the OR circuit OR1 is changed to a "High" level, the NAND circuit NAND1 now delivers a "Low" level, which is inputted as a light emission starting signal SXON to the external flash device OFL. Consequently, the external flash device OFL emits flashlight.

When the external flash device OFL is not used, that is, when the flag OUTF is OUTF=0, a "Low" level is outputted from the terminal $P_{10}$, and consequently, the NAND circuit NAND1 continues to output a "High" level. Accordingly, even if the switch SX is turned on, or even if the switch $S_2$ is turned off, no light emission starting signal SXON is generated. Accordingly, the external flash device OFL does not emit flashlight.

Where the circuit for outputting a light emission starting signal SXON is constituted in such a manner as described above, when a light emission starting signal SXON is received, the external flash device OFL may emit flashlight independently of a current flash mode. Therefore, even if not a flash device for the exclusive use but a conventionally known common flash device is used, flashlight photographing (synchronized with the trailing shutter blind or using a selective one of the internal flash device and an external flash device) similar to that with the flashlight photographing device of the present invention can be achieved.

Otherwise, TTL (through the lens) direct light measurement may be performed using the flashlight adjusting controlling circuit FCC so that, in the trailing shutter blind synchronization mode, when an appropriate exposure amount is obtained before the switch $S_2$ is turned off, even if the switch $S_2$ is on, the trailing shutter blind may be moved without emission of flashlight. With the construction, appropriate exposure can be obtained even if photographing is performed in the trailing shutter blind synchronization mode in a comparatively bright condition. It is to be noted that, in this instance, flashlight may be emitted in response to starting of movement of the trailing shutter blind in order to have an effect of flashlight reflect on a photograph.

Further, in the embodiment described above, exposure values at a peripheral portion and a central portion of a screen to be photographed can be set freely in accordance with a combination of an exposure compensation amount $\Delta SV$ and a $CV$ value. Otherwise however, either one of a central portion and a peripheral portion of a screen may always be exposed appropriately.

In order for a central portion of a screen to be always exposed appropriately, the exposure compensation amount setting circuit EMC should be omitted while $\Delta SV$ should always be $\Delta SV = 0$ in the control program. Then, the mark $EV_T$ should be fixed at the center of the scale as indicated by a broken line in FIG. 20$a$. Generally, a main object to be photographed is positioned most at a central location of a screen to be photographed. Accordingly, where appropriate exposure is obtained always at a central portion of a screen, a main object to be photographed can normally be exposed appropriately, which is convenient particularly for such a person unfamiliar to photographing as a beginner.

In order for a peripheral portion of a screen to be always exposed appropriately, the exposure compensation amount setting circuit EMC should be omitted, and the calculation at step #S75 (FIG. 8) of the control program should be modified in the following manner:

$$AV_F = BV_{AM} + SV - TV_X.$$

With the modification, a peripheral portion of a screen can be exposed appropriately only with ambient light. Then, the mark $EV_{AM}$ should be fixed to the center of the scale as indicated by a broken line in FIG. 20$b$.

Here, an amount of light necessary for a peripheral portion of a screen to be exposed appropriately is investigated.

Since a peripheral portion of a screen is exposed appropriately, in order to make the contrast between the peripheral portion and a central portion equal to $CV$, the central portion should be exposed by a smaller amount equal to $CV$ than an appropriate exposure value. Accordingly, an amount of light necessary for the central portion is given by $$2^{TVX + AVF - CV}.$$

Accordingly, a necessary amount of flashlight is given by $$2^{TVX + AVF - CV} - 2^{BVS + SU}.$$

Thus, a ratio of flashlight with respect to the amount of light at the central portion is given by $$1 - 2^{BUS + SU - (TUX + AUF - CU)} = 1 - 2^{CU - \Delta BU}$$
$$\therefore AV_F = BV_{AM} + SV - TV_x,$$
$$\Delta BV = BV_{AM} - BV_S$$

The expression above is the same as the expression given hereinabove in connection with the preferred embodiment described hereinabove. In short, this represents that the contrast is a relative value and is independent of any absolute value. It is to be noted that, in the embodiment described hereinabove, when a main object to be photographed is in a regularly lighted condition, the ratio shared by flashlight is made greater than ½ in order to reflect an effect of flashlight as much as possible on a photograph. However, the steps #S72 and #S73 (FIG. 8) may be omitted so that a CV value may be set freely (however, $CV \leq \Delta BV$ as described hereinabove).

Further, when the present invention is put into practice, the following various modifications can be made to the embodiment described hereinabove. For example, it may be possible to preliminarily emit flashlight, measure an amount of incident light which includes ambient light and light of the preliminarily emitted flashlight reflected from an object to be photographed and arbitrarily set, in accordance with the measured light amount, an amount of flashlight with which the object can be exposed appropriately in order to control a difference in step between an exposure value of the object irradiated with flashlight and another exposure value of the backgraound with ambient light. Further, a manually operable setting member for setting an irradiation range may be provided on the external flash device OFL so as to allow arbitrary adjustment of a portion to be irradiated with flashlight and another portion not to be irradiated with flashlight and further allow adjustment of a difference between exposure values of the two portions. Further, data regarding an irradiation range of flashlight set by the flash device side may be received from the flash device side so that the irradiation range of flashlight may be indicated in the viewfinder of the camera. Further, a light measuring range with regard to a central portion and a peripheral portion of a screen to be photographed may be changed over automatically. Further, the setting means for setting a difference in exposure value between a central portion and a peripheral portion may be provided not on the camera side but on the flash device side such that data regarding the difference in exposure value set by the flash device side may be transmitted from the flash device to the camera, or else such difference in exposure value may be fixed. It is to be noted that the present invention can be applied to a camera which has a built-in zoom flash device. In addition, an irradiation range of flashlight and a light measuring range at a central portion of a screen to be photographed may be set automatically in response to a photographing magnification so as to control an amount of flashlight in order to obtain a set (or fixed) difference in exposure value.

In the embodiment described hereinabove, the irradiation range of flashlight is varied in response to a photographing magnification irrespective of whether a main object to be photographed is in a backlighted condition or in a regularly lighted condition. By the way, when flashlight is to be emitted when a main object is in a backlighted condition, normally the field of view is very dark and the aperture opening is set to a great dimension. On the other hand, in the case of a regularly lighted condition, normally the field of view is light, and accordingly, the aperture opening is set to a small dimension. Accordingly, in a backlighted condition, the distance over which flashlight reaches is comparatively small.

Figure 29:
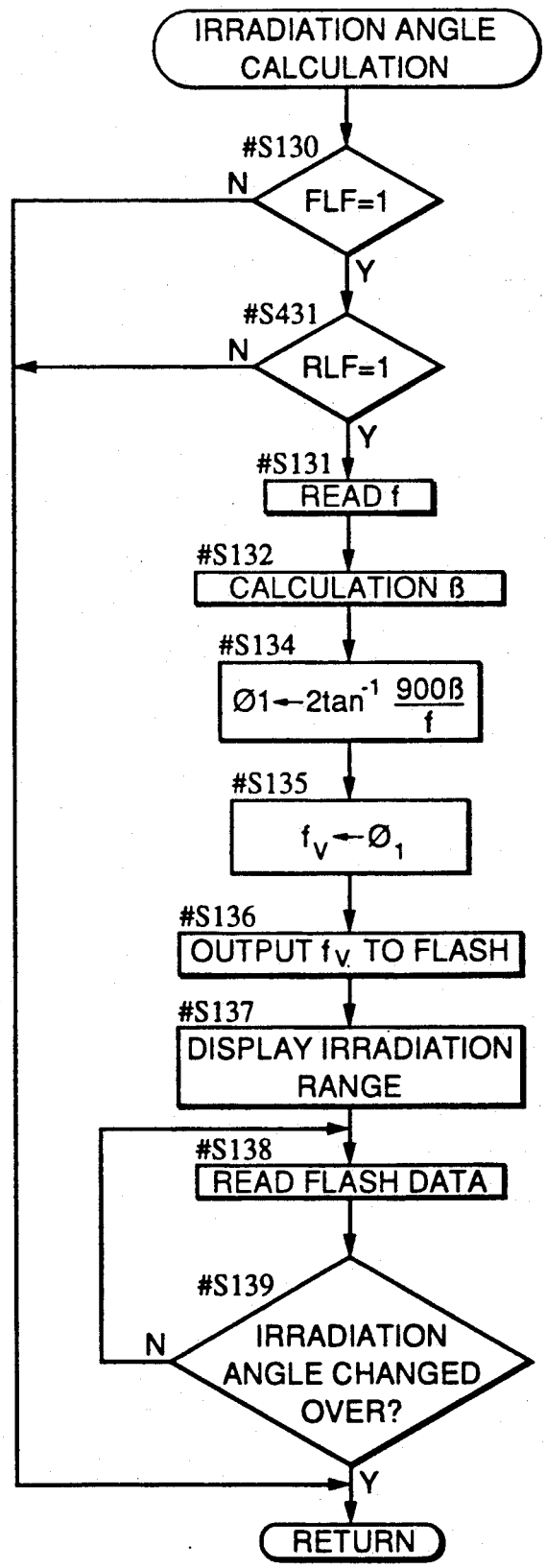
FIGS. 29 and 30 are flow charts illustrating further modified operation of the camera system shown in FIG. 1.

With such circumstances taken into consideration, it is very significant to decrease the irradiation range of flashlight to increase the guide number $GN_o$. when an object is in a backlighted condition, but this is less significant when an object is in a regularly lighted condition. Further, if the irradiation range is decreased when the brightness is low, then only an object at a central portion of a screen to be photographed may be exposed to light while another object at a peripheral portion is not exposed to light at all. Therefore, the irradiation range of flashlight may be varied in response to a photographing magnification only when an object is in a backlighted condition. The intention can be achieved by such modification to the irradiation angle calculation routine shown in FIG. 12 as seen in FIG. 29. Referring to FIG. 29, the modified irradiation angle calculation routine includes additional step #S433 interposed between the steps #S130 and #S131 for checking the backlight flage RLF such that, when RLF=1, the sequence may advance to step #S131, but when RLF=0, the sequence returns directly to the original step.

Figure 30:
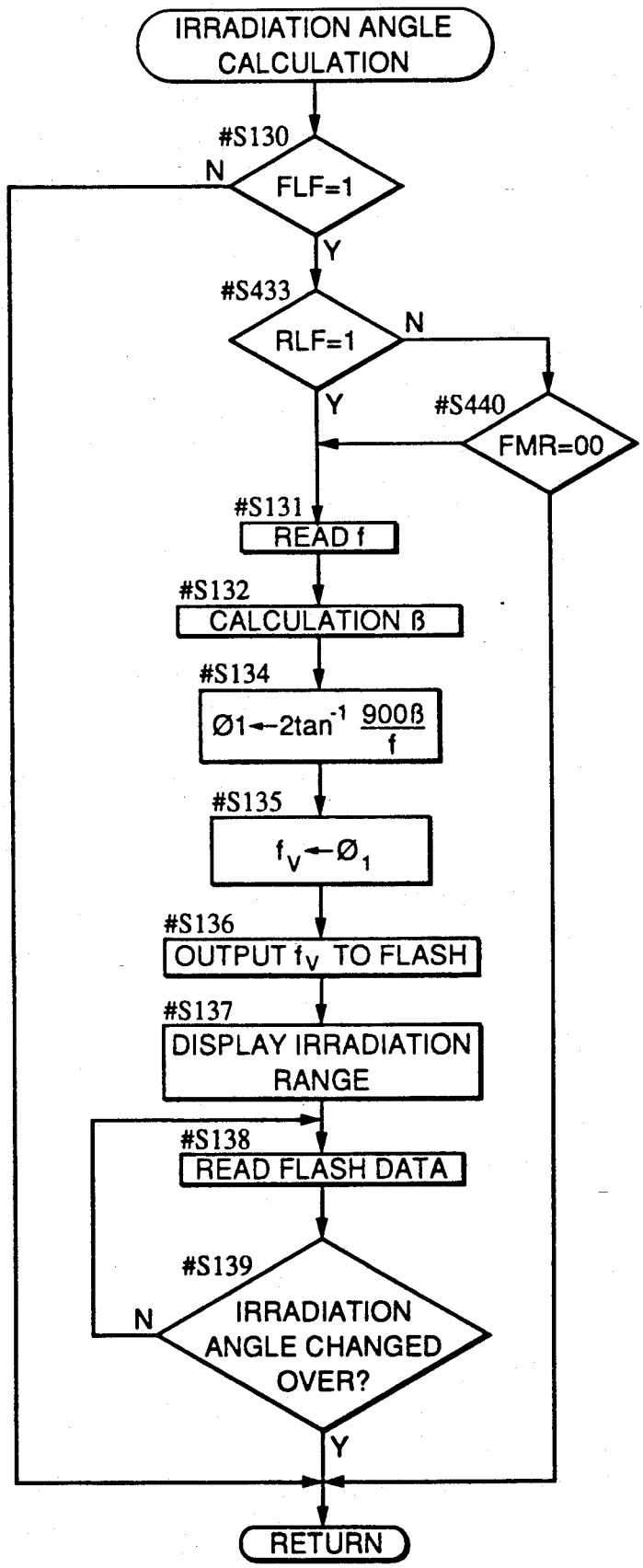

On the other hand, in the compulsory light emission mode, a photographer has an intention to have an effect of flashlight reflect on a photograph. Accordingly, in the compulsory light emission mode, it is desirable to cause flashlight to reach as far as possible. Thus, the modification shown in FIG. 29 may be further modified such that the irradiation range of flashlight may be varied in response to a photographing magnification also when the camera is in the compulsory light emission mode. In order to achieve such modification, the modified irradiation angle calculation routine shown in FIG. 29 is further modified in such a manner as seen in FIG. 30. In particular, referring to FIG. 30, when RLF=0 at step #S433, the flash mode register FMR is checked at an additional step #S440. In case FMR="00", the sequence advances to step #S131, but when FMR≠"00", the sequence returns to the original step. With such modification, if the current flash mode is set to the automatic light emission mode (FMR="01") when the brightness is low (in a regularly lighted condition), then all of objects to be photographed which remain within a photographing range and within a range in which flashlight reaches can be exposed with flashlight. Then, if the current flash mode is set to the compulsory light emission mode (FMR="00"), then flashlight can be projected only to a main object to be photographed so that the main object may be exposed to light.

Further, while in the embodiment described hereinabove one of the internal flash device IFL and the external flash device OFL which has been charged up precedently to the other is caused to emit light, the present invention can be applied also to a camera system which employs two external flash devices. Also, the present invention can be applied to a camera which has two built-in flash devices therein. Or else, where three or more flash devices (whether they are of the built-in type or the attachment type) are used, one of the flash devices which has been charged up at the earliest may be caused to emit flashlight.

Having now fully described the invention, it will be apparent to one of ordinary skill in the art that many changes and modifications can be made thereto without departing from the spirit and scope of the invention as set forth herein.

What is claimed is:

1. A flashlight photographing device, comprising:
 a battery power source;
 a first high power consuming circuit for receiving power from said battery power source, said first high power consuming circuit requiring large current at energization thereof;
 a second high power consuming circuit for receiving power from said battery power source, said second high power consuming circuit requiring large current at energization thereof;
 detecting means for detecting whether or not the power supply of said battery power source recovers to a first predetermined value with which said first high power consuming circuit is capable of operating or reaches a second predetermined value with which said second high power consuming circuit is capable of operating, the second predetermined value being lower than the first predetermined value; and
 power supply controlling means for initially permitting supply of power from said battery power source to said first high power consuming circuit while inhibiting supply of power from said battery power source to said second high power consuming circuit and then permitting, after the power supply from said battery power source exceeds the second predetermined value, supply of power from said battery power source to said second high power consuming circuit, whereby supply of power from said battery power source to both of said first high power consuming circuit and said second high power consuming circuit is permitted while the power supply of said battery power source rises from the second predetermined value to the first predetermined value.

2. A flashlight photographing device, comprising:
 a battery power source;
 a first high power consuming circuit for receiving power from said battery power source, said first high power consuming circuit including a xenon tube for emitting flashlight, a boosting circuit for boosting a low voltage of said battery power source to a sufficiently high voltage to permit said xenon tube to emit flashlight, and a main capacitor adapted to be charged with energy of a high voltage boosted by said boosting circuit;
 a second high power consuming circuit for receiving power from said battery power source;
 detecting means for detecting whether or not the charged voltage of said main capacitor reaches a first predetermined value with which said xenon tube is capable of emitting flashlight or reaches a second predetermined value with which second high power consuming circuit is capable of operating, the second predetermined value being lower than the first predetermined value; and power supply controlling means for initially permitting supply of power from said battery power source to said first high power consuming circuit while inhibiting supply of power from said battery power source to said second high power consuming circuit and then permitting, after the charged voltage of said main capacitor exceeds the second predetermined value, supply of power from said battery power source to said second high power consuming circuit, whereby supply of power from said battery power source to both of said boosting circuit and said second high power consuming circuit is permitting while the charged voltage of said main capacitor rises from the second predetermined value to the first predetermined value.

3. A flashlight photographing device as claimed in claim 2, wherein said second high power consuming circuit is a focusing motor for driving a focusing lens.

4. A flashlight photographing device as claimed in claim 2, wherein said second high power consuming circuit is a film feeding motor for driving a film feeding device of a camera.

5. A flashlight photograhing device, comprising:

a first circuit for accumulating an electric energy into a capacitor which serves as a power source of an electronic flash;

a second circuit;

a detecting circuit for detecting a voltage of the capacitor; and a control circuit for controlling said first and second circuits so as to permit operation of said first circuit while inhibiting operation of said second circuit until said detecting circuit detects that the voltage of said capacitor reaches a first predetermined level, to permit operation of said second circuit as well as operation of said first circuit after said detecting circuit detects that the voltage reaches the first predetermined level, and to permit the operation of said second circuit while inhibiting the operation of said first circuit after said detecting circuit detects that the voltage reaches a second predetermined level which is higher than said first predetermined level.

6. A flashlight photographing device as claimed in claim 5, wherein said second circuit serves as a driving circuit for driving a motor.

7. A flashlight photographing device as claimed in claim 5, wherein said first predetermined level is a voltage level which is sufficient to actuate said second circuit.

* * * * *

UNITED STATES PATENT AND TRADEMARK OFFICE
CERTIFICATE OF CORRECTION

PATENT NO. : 5,117,250

DATED : May 26, 1992

INVENTOR(S) : Akihido Fujino, et al.

It is certified that error appears in the above-identified patent and that said Letters Patent is hereby corrected as shown below:

In col. 7, line 40, change "P1 to P9" --$P_1$ to $P_9$--.

In col. 9, line 3, change "charge" to --charged--.

In col. 9, line 6, change "controllin" to --controlling--.

In col. 9, line 17, change "continues" to --continue--.

In col. 10, line 23, change "gererator" to --generator--.

In col. 10, line 25, change "pule" to --pulse--.

In col. 10, line 58, change "when" to --of--.

In col. 11, line 16, change "an" to --any--.

In col. 11, line 32, change "modes" to --mode--.

In col. 11, line 67, change "or" to --of--.

In col. 12, line 16, change "infocus" to --in-focus--.

In col. 12, line 62, change "FLONKF=0" to --FLOKF=0--.

In col. 13, line 46, change "#1" to --#S1--.

UNITED STATES PATENT AND TRADEMARK OFFICE
CERTIFICATE OF CORRECTION

PATENT NO. : 5,117,250

DATED : May 26, 1992

INVENTOR(S) : Akihiko Fujino, et al.

It is certified that error appears in the above-identified patent and that said Letters Patent is hereby corrected as shown below:

In col. 14, line 15, change "#S" to --#S10--.

In col. 14, line 26, change "#12" to --#S12--.

In col. 14, line 61, change "#26" to --#S26--.

In col. 17, line 24, after "Then" insert --,-- (comma).

In col. 18, line 56, change "#67" to --#S67--.

In col. 18, line 63, change "charged" to --changed--.

In col. 20, line 8, change "FIGS." to --FIG.--.

In col. 20, line 18, change "porrtion" to --portion--.

In col. 20, line 40, after "exposed" insert --more--.

In col. 20, line 45, change "$\Delta SU$" to --$\Delta SV$.

In col. 20, line 50, change "BUS + SU" to --BVS + SV--.

In col. 20, line 55, change "$2^{TV+AV+\Delta SU} - 2^{BUS+SU}$" to --$2^{TV+AV+ASV} - 2^{BVS+SV}$--.

UNITED STATES PATENT AND TRADEMARK OFFICE
CERTIFICATE OF CORRECTION

PATENT NO. : 5,117,250                     Page 3 of 5
DATED     : May 26, 1992,
INVENTOR(S) : Akihiko Fujino, et al.

It is certified that error appears in the above-identified patent and that said Letters Patent is hereby corrected as shown below:

In col. 21, lines 26-30, change $$"\frac{2^{TU+AU+\Delta SU} - 2^{BUS+SU}}{2^{TU+AU+\Delta SU}} = 1 - \frac{2^{BUS+SU}}{2^{BUAM+SU-CU}}$$

$$= 1 - 2^{BUS+SU-(BUAM+SU-CU)}$$

$$= 1 - 2^{CU-(BUAM-BUS)}$$

$$= 1 - 2^{CU-\Delta BU}"$$

to $$--\frac{2^{TV+AV+\Delta SV} - 2^{BVS+SV}}{2^{TV+AV+\Delta SV}} = 1 - \frac{2^{BVS+SV}}{2^{BVAM+SV-CV}}$$

$$= 1 - 2^{BVS+SV-(BVAM+SV-CV)}$$

$$= 1 - 2^{CV-(BVAM-BVS)}$$

$$= 1 - 2^{CV-\Delta BV}--$$

In col. 22, line 62, change "$AV_F = BVA_M + SV - \Delta CV - TV_X$" to $--AV_F = BVA_M + SV - \Delta SV - CV - TV_X--$.

UNITED STATES PATENT AND TRADEMARK OFFICE
CERTIFICATE OF CORRECTION

PATENT NO. : 5,117,250
DATED : May 26, 1992
INVENTOR(S) : Akihiko Fujino, et al.

It is certified that error appears in the above-identified patent and that said Letters Patent is hereby corrected as shown below:

In col. 23, line 63, change "adjusted" to --adjusting--.

In col. 24, line 27, change "#126" to --S126--.

In col. 25, line 11, delete "the" (first occurrence); and change "changing" to --charging--.

In col. 25, line 33, change "1" to --$\ell$--.

In col. 25, line 38, change "1/2d" to --$\ell$/2d--.

In col. 25, line 47, change "1=1,800" to --$\ell$ = 1,800--.

In col. 27, line 14, before "sequence" insert --the--.

In col. 27, line 32, change "#S169" to --#S162--.

In col. 27, line 37, change "FRM" to --FMR--(three occurrences).

In col. 27, line 44, change "FMR = "11"" to --FMR = "01"--.

In col. 27, line 55, change "or" to --nor--.

UNITED STATES PATENT AND TRADEMARK OFFICE
CERTIFICATE OF CORRECTION

PATENT NO. : 5,117,250
DATED : May 26, 1992
INVENTOR(S) : Akihiko Fujino, et al.

It is certified that error appears in the above-identified patent and that said Letters Patent is hereby corrected as shown below:

In col. 28, line 5, after "for" insert --the--.

In col. 34, line 8, change "SU" to --SV--.

In col. 34, line 14, change "$1-2^{BUS+SU-(TUX+AUF-CU)}=1-2^{CU-\Delta BU}$" to --$1-2^{BVS+SV-(TVX+AVF-CV)}=1-2^{CV-\Delta BV}$--.

In col. 37, line 17 (claim 2, line 34), change "permitting" to --permitted--.

Signed and Sealed this

Twenty-eighth Day of September, 1993

Attest:

BRUCE LEHMAN

Attesting Officer        Commissioner of Patents and Trademarks